United States Patent
Lee et al.

(10) Patent No.: US 9,553,645 B2
(45) Date of Patent: *Jan. 24, 2017

(54) DATA TRANSMISSION DEVICE AND METHOD IN A WIRELESS COMMUNICATIONS SYSTEM

(71) Applicant: LG ELECTRONICS INC., Seoul (KR)

(72) Inventors: Moon Il Lee, Anyang-si (KR); Ja Ho Koo, Anyang-si (KR); Hyun Soo Ko, Anyang-si (KR); Jae Hoon Chung, Anyang-si (KR); Bin Chul Ihm, Anyang-si (KR); Yeong Hyeon Kwon, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,075

(22) Filed: Oct. 14, 2014

(65) Prior Publication Data
US 2015/0063485 A1 Mar. 5, 2015

Related U.S. Application Data

(63) Continuation of application No. 13/141,067, filed as application No. PCT/KR2009/007565 on Dec. 17, 2009, now Pat. No. 8,891,651.

(Continued)

(30) Foreign Application Priority Data

Dec. 15, 2009 (KR) ........................ 10-2009-0124865

(51) Int. Cl.
*H04B 7/02* (2006.01)
*H04L 1/02* (2006.01)
(Continued)

(52) U.S. Cl.
CPC .......... *H04B 7/0469* (2013.01); *H04B 7/0413* (2013.01); *H04B 7/0639* (2013.01); *H04B 7/0465* (2013.01); *H04B 7/0478* (2013.01)

(58) Field of Classification Search
CPC .... H04L 5/0023; H04L 5/0053; H04B 7/0639; H04B 7/0456; H04B 7/024
(Continued)

(56) References Cited

U.S. PATENT DOCUMENTS 7,995,670 B2   8/2011   Kim et al.
8,059,733 B2   11/2011  Khojastepour et al.
(Continued)

FOREIGN PATENT DOCUMENTS

KR   10-2008-0070151   7/2008
KR   10-2008-0073624   8/2008
(Continued)

OTHER PUBLICATIONS

European Patent Office Application Serial No. 09833647.2, Search Report dated May 27, 2014, 8 pages.
(Continued)

*Primary Examiner* — Shuwang Liu
*Assistant Examiner* — Sung Ahn
(74) *Attorney, Agent, or Firm* — Lee Hong Degerman Kang Waimey

(57) ABSTRACT

The present invention provides a data transmission device and method in a wireless communication system. The device comprises a processor which is connected with the M antennas and which is formed so as to generate data to be transmitted through the M antennas, on the basis of a precoding matrix; the precoding matrix is generated based on a plurality of matrices; and a first matrix, which is one matrix among the plurality of matrices, is selected from within a codebook for N antennas (where N<M).

4 Claims, 13 Drawing Sheets

Related U.S. Application Data

(60) Provisional application No. 61/139,618, filed on Dec. 21, 2008.

(51) Int. Cl.
  *H04B 7/04* (2006.01)
  *H04B 7/06* (2006.01)

(58) Field of Classification Search
  USPC .......................................... 375/295
  See application file for complete search history.

(56) References Cited

U.S. PATENT DOCUMENTS

| | | | |
|---|---|---|---|
| 8,325,852 B2* | 12/2012 | Zhang et al. | 375/299 |
| 2008/0008110 A1 | 1/2008 | Kishigami et al. | |
| 2008/0037675 A1* | 2/2008 | Lin et al. | 375/262 |
| 2008/0043677 A1 | 2/2008 | Kim et al. | |
| 2008/0108310 A1* | 5/2008 | Tong et al. | 455/69 |
| 2008/0186212 A1 | 8/2008 | Clerckx et al. | |
| 2008/0225962 A1* | 9/2008 | Zhou et al. | 375/260 |
| 2008/0285667 A1* | 11/2008 | Mondal et al. | 375/260 |
| 2009/0017769 A1 | 1/2009 | Chen et al. | |
| 2009/0041140 A1* | 2/2009 | Xiao et al. | 375/260 |
| 2009/0154577 A1 | 6/2009 | Lindoff et al. | |
| 2009/0262856 A1 | 10/2009 | Onggosanusi et al. | |
| 2010/0104034 A1* | 4/2010 | Nam et al. | 375/260 |
| 2010/0150266 A1 | 6/2010 | Mondal et al. | |

FOREIGN PATENT DOCUMENTS

| | | |
|---|---|---|
| KR | 10-2008-0086333 | 9/2008 |
| KR | 10-2008-0095732 | 10/2008 |
| WO | 2008/085107 | 7/2008 |
| WO | 2008/098225 | 8/2008 |
| WO | 2008/116181 | 9/2008 |
| WO | 2008115036 | 9/2008 |

OTHER PUBLICATIONS

Ericsson et al., "Refinement on MIMO Precoding Schemes", R1-081565, 3GPP TSG RAN Meeting WG1 #52bis, Mar. 2008, 4 pages.

Ericsson, "Precoding Considerations in LTE MIMO Downlink," R1-071044, TSG-RAN WG1 #48, Feb. 2007, 8 pages.

LG Electronics, "Codebook Design and Evaluation for E-UTRA MIMO Precoding—4Tx Scheme," R1-071540, 3GPP TSG RAN WG1 Meeting #48bis, Mar. 2007, 7 pages.

Japan Patent Office Application Serial No. 2011-542010, Office Action dated Jan. 30, 2013, 3 pages.

The State Intellectual Property Office of the People's Republic of China Application Serial No. 200980156202.2, Office Action dated Jul. 19, 2013, 7 pages.

\* cited by examiner

DATA TRANSMISSION DEVICE AND METHOD IN A WIRELESS COMMUNICATIONS SYSTEM

CROSS-REFERENCE TO RELATED APPLICATIONS

This application is a continuation of U.S. patent application Ser. No. 13/141,067, filed on Jun. 20, 2011, now U.S. Pat. No. 8,891,651, which is the National Stage filing under 35 U.S.C. 371 of International Application No. PCT/KR2009/007565, filed on Dec. 17, 2009, which claims the benefit of earlier filing date and right of priority to Korean Patent Application No. 10-2009-0124865, filed on Dec. 15, 2009, and also claims the benefit of U.S. Provisional Application Ser. No. 61/139,618, filed on Dec. 21, 2008, the contents of which are all hereby incorporated by reference herein in their entirety.

TECHNICAL FIELD

The present invention relates to wireless communications, and more particularly, to an apparatus and method for information transmission in a wireless communication system.

BACKGROUND ART

Wireless communication systems are widely spread all over the world to provide various types of communication services such as voice or data. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

A multiple input multiple output (MIMO) scheme is used as a technique for supporting a reliable high-speed data service. The MIMO scheme uses multiple transmit antennas and multiple receive antennas to improve data transmission/reception efficiency. Examples of the MIMO scheme include spatial multiplexing, transmit diversity, beamforming, etc.

A MIMO channel matrix is formed by multiple receive antennas and multiple transmit antennas. A rank can be obtained from the MIMO channel matrix. The rank is the number of spatial layers. The rank may also be defined as the number of spatial streams that can be simultaneously transmitted by a transmitter. The rank is also referred to as a spatial multiplexing rate. If the number of transmit antennas is Nt and the number of receive antennas is Nr, a rank R satisfies R≤min{Nt, Nr}.

Meanwhile, there is an ongoing standardization effort for an international mobile telecommunication-advanced (IMT-A) system in the international telecommunication union (ITU) as a next generation (i.e., post $3^{rd}$ generation) mobile communication system. The IMT-A system aims at the support of an Internal protocol (IP)-based multimedia seamless service by using a high-speed data transfer rate of 1 gigabits per second (Gbps) in a downlink and 500 megabits per second (Mbps) in an uplink. A $3^{rd}$ generation partnership project (3GPP) is considering a 3GPP long term evolution-advanced (LTE-A) system as a candidate technique for the IMT-A system. It is expected that the LTE-A system is developed to further complete an LTE system while maintaining backward compatibility with the LTE system. This is because the support of compatibility between the LTE-A system and the LTE system facilitates user convenience. In addition, the compatibility between the two systems is also advantageous from the perspective of service providers since the existing equipment can be reused.

In the LTE system, up to 4 transmit antennas are supported in downlink transmission. In the LTE-A system, it is considered to support up to 8 transmit antennas in downlink transmission. As such, a new system in which the number of transmit antennas is increased in comparison with the legacy system can be taken into consideration. The greater the number of transmit antennas, the higher the information transfer rate, the reliability, etc.

Accordingly, there is a need for an apparatus and method for effective information transmission in a wireless communication system in which the number of transmit antennas is increased.

SUMMARY OF INVENTION

Technical Problem

The present invention provides an apparatus and method for information transmission in a wireless communication system.

Technical Solution

In an aspect, an information transmission apparatus is provided. The apparatus includes M antennas, and a processor coupled to the M antennas and configured to generate information to be transmitted through the M antennas on the basis of a precoding matrix, wherein the precoding matrix is generated based on a plurality of matrices, and a first matrix, which is one matrix among the plurality of matrices, is selected from within a codebook for N antennas, where N<M.

An information transmission method is provided. The method includes generating information on the basis of a precoding matrix, and transmitting the information through M antennas, wherein the precoding matrix is generated based on a plurality of matrices, and a first matrix, which is one matrix among the plurality of matrices, is selected from within a codebook for N antennas, where N<M.

Advantageous Effects

An apparatus and method for effective information transmission in a wireless communication system are provided. Therefore, overall system performance can be improved.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the LTE.

For clarity, the following description will focus on the LTE/LTE-A. However, technical features of the present invention are not limited thereto.

Figure 1:
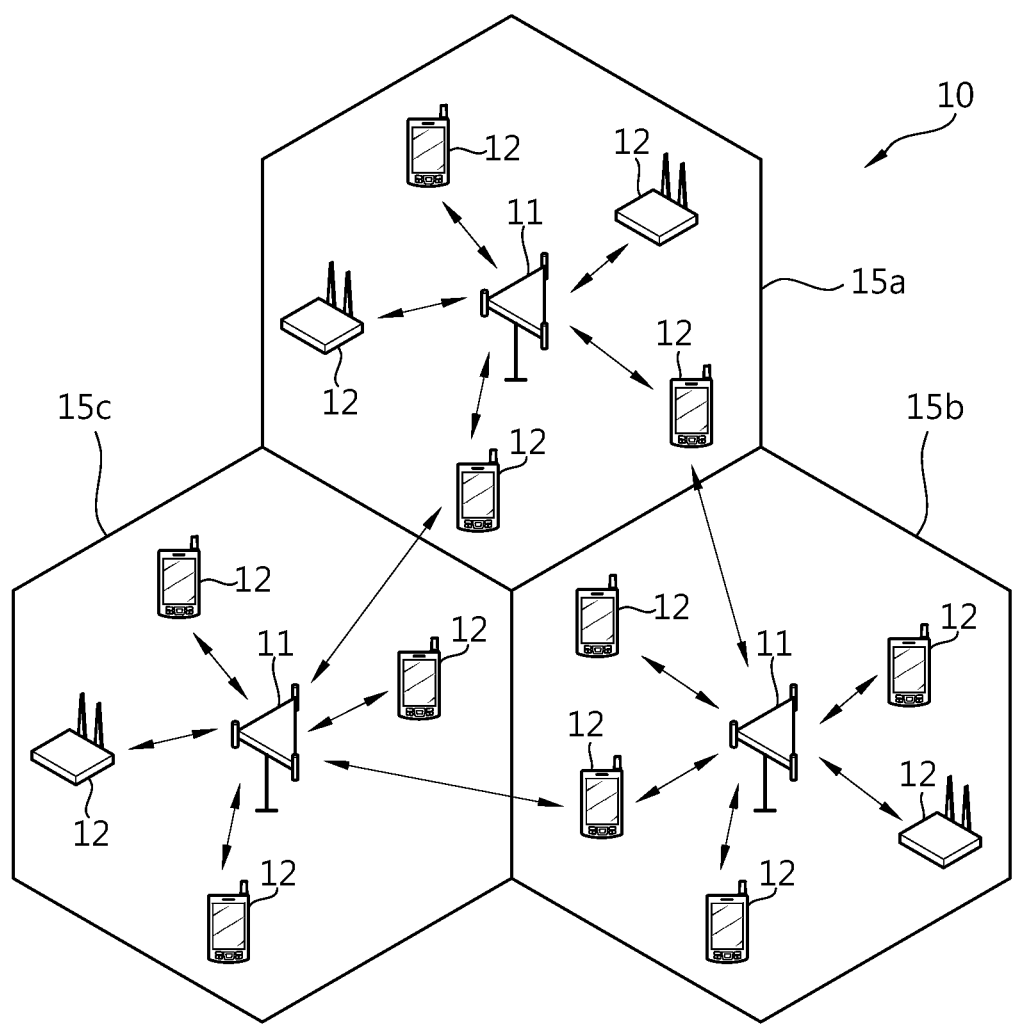
FIG. 1 shows a wireless communication system.

FIG. 1 shows a wireless communication system.

Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. The BS 11 is generally a fixed station that communicates with the UE 12 and may be referred to as another terminology, such as an evolved node-B (eNB), a base transceiver system (BTS), an access point, etc.

Hereinafter, a downlink (DL) implies communication from the BS to the UE, and an uplink (UL) implies communication from the UE to the BS. In the DL, a transmitter may be a part of the BS, and a receiver may be a part of the UE. In the UL, the transmitter may be a part of the UE, and the receiver may be a part of the BS.

The wireless communication system can support multiple antennas. The transmitter may use a plurality of transmit (Tx) antennas, and the receiver may use a plurality of receive (Rx) antennas. The Tx antenna denotes a physical or logical antenna used for transmission of one signal or stream. The Rx antenna denotes a physical or logical antenna used for reception of one signal or stream. When the transmitter and the receiver use a plurality of antennas, the wireless communication system may be referred to as a multiple input multiple output (MIMO) system.

A wireless communication process is preferably implemented with a plurality of independent hierarchical layers rather than one single-layer. A structure of a plurality of hierarchical layers is referred to as a protocol stack. The protocol stack may refer to an open system interconnection (OSI) model which is a widely known protocol for communication systems.

Figure 2:
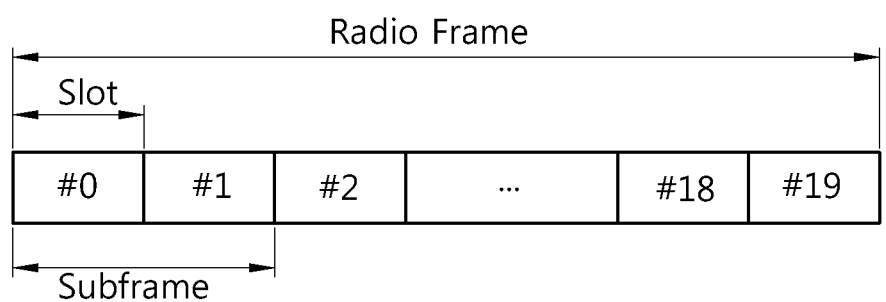
FIG. 2 shows a structure of a radio frame.

FIG. 2 shows a structure of a radio frame.

Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The radio frame of FIG. 2 is shown for exemplary purposes only. Thus, the number of subframes included in the radio frame or the number of slots included in the subframe may change variously.

Figure 3:
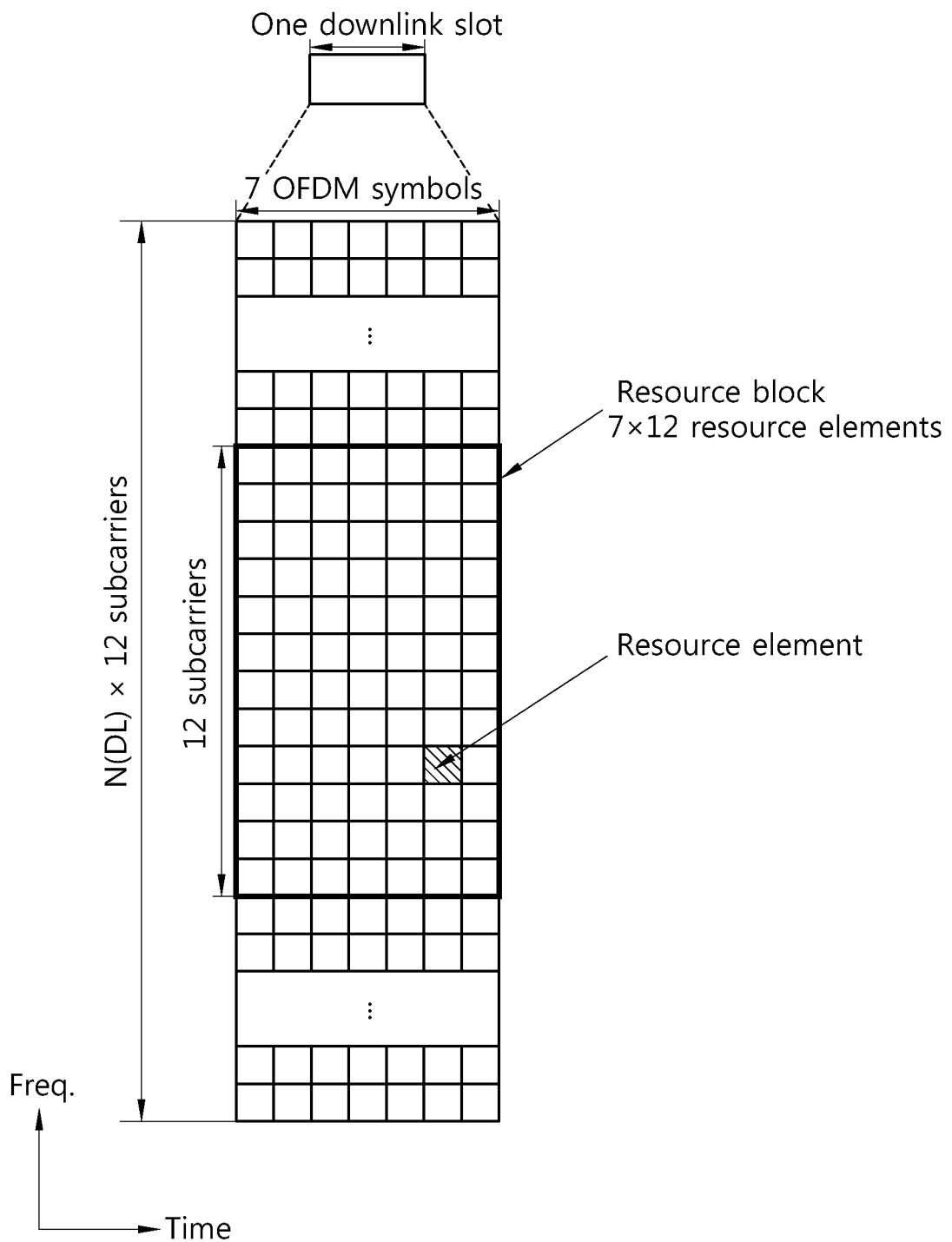
FIG. 3 shows an example of a resource grid for one downlink slot.

FIG. 3 shows an example of a resource grid for one DL slot.

Referring to FIG. 3, the DL slot includes a plurality of orthogonal frequency division multiplexing (OFDM) symbols in a time domain, and includes N(DL) resource blocks in a frequency domain. The OFDM symbol is for expressing one symbol period, and may also be referred to as another terminology, such as an OFDMA symbol, an SC-FDMA symbol, etc., according to a multiple access scheme. The number N(DL) of resource blocks included in the DL slot depends on a DL transmission bandwidth determined in a cell. One resource block includes a plurality of subcarriers in the frequency domain.

Each element on the resource grid is referred to as a resource element. Although it is described herein that one resource block includes 7×12 resource elements consisting of 7 OFDM symbols in the time domain and 12 subcarriers in the frequency domain for example, the number of OFDM symbols and the number of subcarriers included in the resource block are not limited thereto. The number of OFDM symbols may variously change depending on a cyclic prefix (CP) length and a subcarrier spacing. For example, in case of a normal CP, the number of OFDM symbols is 7, and in case of an extended CP, the number of OFDM symbols is 6.

The resource grid for one DL slot of FIG. 3 can also apply to a resource grid for a UL slot.

Figure 4:
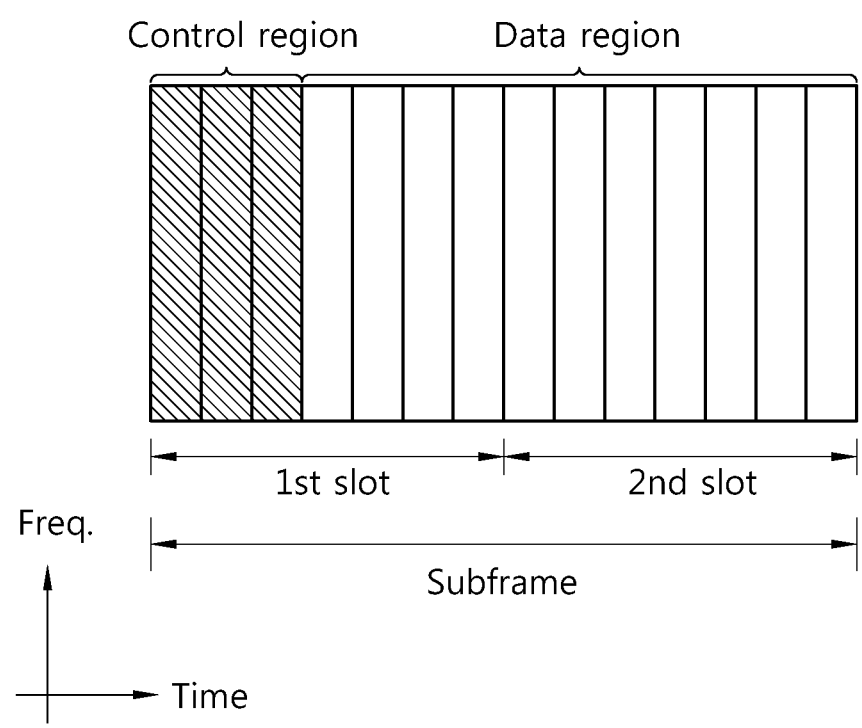
FIG. 4 shows an exemplary structure of a downlink subframe.

FIG. 4 shows an exemplary structure of a DL subframe.

Referring to FIG. 4, the DL subframe includes two consecutive slots. First 3 OFDM symbols of a $1^{st}$ slot included in the DL subframe correspond to a control region, and the remaining OFDM symbols correspond to a data region. Herein, the control region includes 3 OFDM symbols for exemplary purposes only.

A physical downlink shared channel (PDSCH) may be allocated to the data region. DL data is transmitted through the PDSCH.

A control channel may be allocated to the control region. Examples of the control channel include a physical control format indicator channel (PCFICH), a physical hybrid automatic repeat request (HARQ) indicator channel (PHICH), a physical downlink control channel (PDCCH), etc.

The PCFICH carries information indicating the number of OFDM symbols used for transmission of PDCCHs in a subframe to a UE. The number of OFDM symbols used for PDCCH transmission may change in every subframe. The PHICH carries HARQ acknowledgement (ACK)/negative acknowledgement (NACK) for UL data.

The PDCCH carries DL control information. Examples of the DL control information include DL scheduling information, UL scheduling information, or a UL power control command, etc. The DL scheduling information is also referred to as a DL grant. The UL scheduling information is also referred to as a UL grant.

Figure 5:
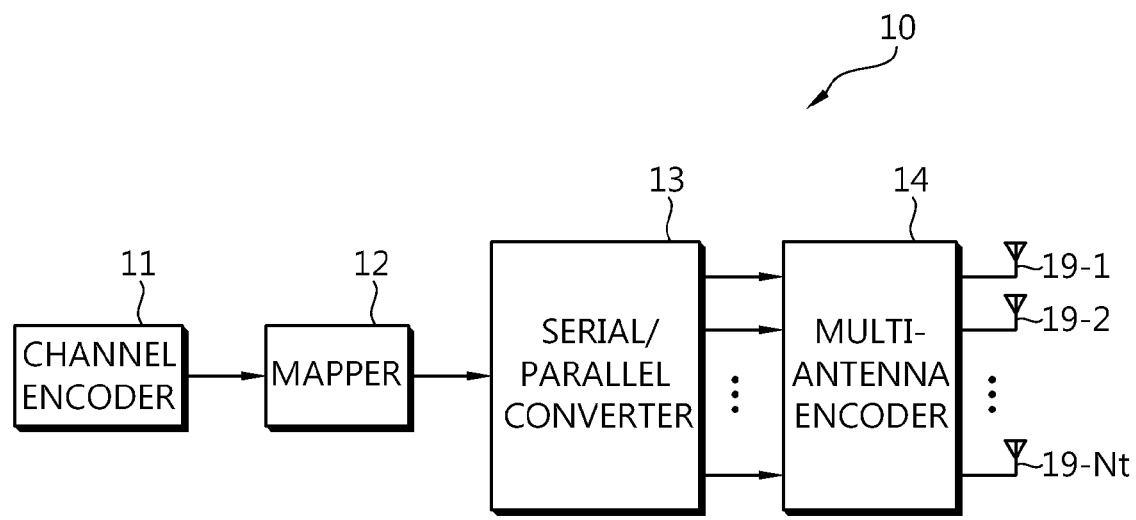
FIG. 5 is a block diagram showing an exemplary structure of a transmitter including a plurality of transmit antennas.

FIG. 5 is a block diagram showing an exemplary structure of a transmitter including a plurality of Tx antennas. Herein, the transmitter may be a part of a UE or a BS.

Referring to FIG. 5, a transmitter 10 includes a channel encoder 11, a mapper 12, a serial/parallel converter 13, a multi-antenna encoder 14, and a plurality of Tx antennas 19-1, 19-2, . . . , 19-Nt.

The channel encoder 11 is coupled to the mapper 12. The mapper 12 is coupled to the serial/parallel converter 13. The serial/parallel converter 13 is coupled to the multi-antenna encoder 14. The multi-antenna encoder 14 is coupled to the plurality of Tx antennas 19-1, 19-2, . . . , 19-Nt.

The channel encoder 11 receives an information bit, and performs channel coding on the information bit to generate an encoded bit.

The information bit corresponds to information to be transmitted by the transmitter 10. The information bit may have various sizes according to the information. There is no particular limitation on the information, and thus the information may be user data, control information, etc. The transmitter 10 can be implemented in a physical layer. In this case, the information may be derived from a higher layer such as a medium access control (MAC) layer.

Channel coding is an operation of attaching a redundant bit to the information bit, and is performed to decrease an effect on noise or the like that is imposed on a channel when transmission is performed. There is no limitation on a channel coding scheme. Examples of the channel coding scheme include turbo coding, convolution coding, block coding, etc. The coded bit generated by the channel encoder 11 may have various sizes.

The mapper 12 maps the coded bit input from the channel encoder 11 to a symbol that represents a location on a signal constellation so as to generate a modulation symbol. There is no limitation on a modulation scheme. Examples of the modulation scheme include m-phase shift keying (m-PSK), m-quadrature amplitude modulation (m-QAM), etc. The number of modulation symbols generated by the mapper 12 may be various according to the modulation scheme and the size of the coded bit input to the mapper 12.

The serial/parallel converter 13 converts serially input modulation symbols into parallel modulation symbols. The multi-antenna encoder 14 converts the modulation symbols into time-space signals. The Tx antennas 19-1, 19-2, . . . , 19-Nt transmit the time-space signals to channels.

Figure 6:
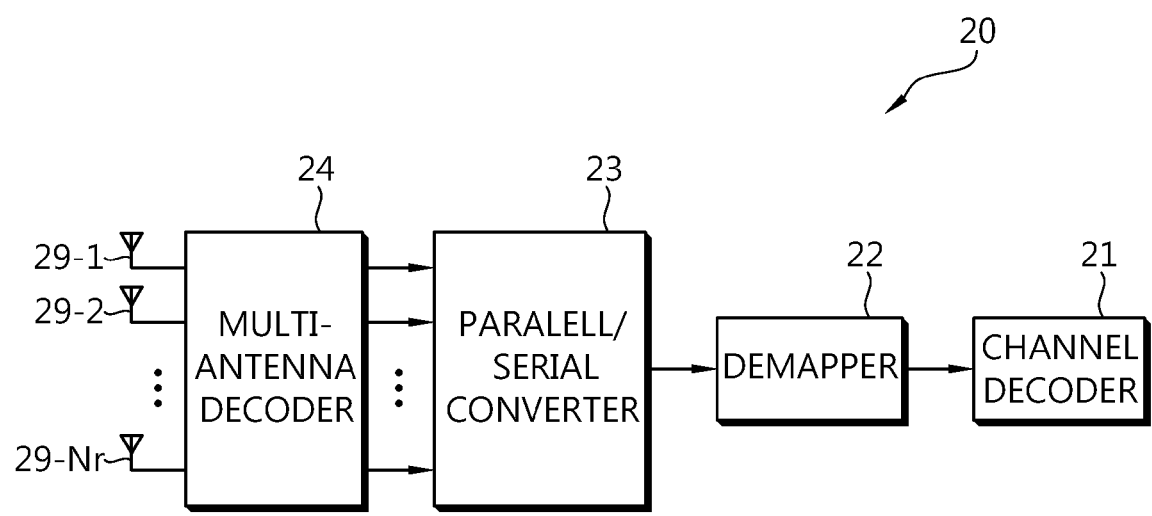
FIG. 6 is a block diagram showing an exemplary structure of a receiver.

FIG. 6 is a block diagram showing an exemplary structure of a receiver. Herein, the receiver may be a part of a UE or a BS.

Referring to FIG. 6, a receiver 20 includes a plurality of Rx antennas 29-1, 29-2, . . . , 29-Nr, a multi-antenna decoder 24, a parallel/serial converter 23, a demapper 22, and a channel decoder 21.

The plurality of Rx antennas 29-1, 29-2, . . . , 29-Nr are coupled to the multi-antenna decoder 24. The multi-antenna decoder 24 is coupled to the parallel/serial converter 23. The parallel/serial converter 23 is coupled to the demapper 22. The demapper 22 is coupled to the channel decoder 21.

The plurality of Rx antennas 29-1, 29-2, . . . , 29-Nr receive time-space signals from channels. The multi-antenna decoder 24 outputs Rx symbols from the time-space signals. The parallel/serial converter 23 converts the Rx symbols input in parallel into serial Rx symbols.

The demapper 22 generates a coded bit estimated from the Rx symbol. The demapper 22 estimates the modulation symbol transmitted by the transmitter 10 (see FIG. 5) from the Rx symbol, and performs demodulation on the estimated modulation symbol to generate an estimated coded bit. The demapper 22 may include a detector to estimate the modulation symbol from the Rx symbol.

The channel decoder 21 performs channel decoding on the estimated coded bit to generate an estimated information bit. The receiver 20 estimates information transmitted by the transmitter 10 (see FIG. 5) from the estimated information bit.

The transmitter including the plurality of Tx antennas can transmit information by performing spatial processing according to a transmission scheme. Although there are various transmission schemes, it is assumed hereinafter that the transmitter transmits information by using precoding.

Figure 7:
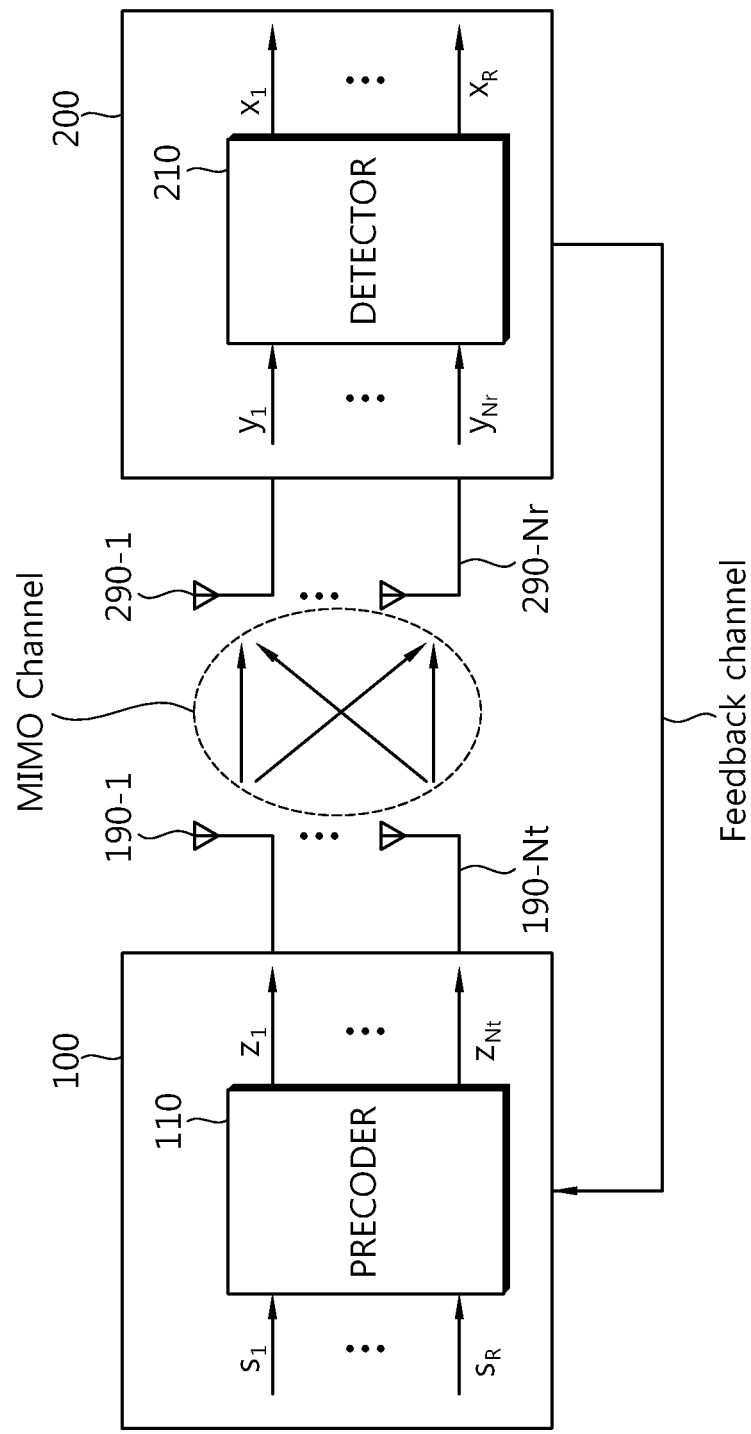
FIG. 7 is a block diagram showing an example of an apparatus for wireless communication.

FIG. 7 is a block diagram showing an example of an apparatus for wireless communication.

Referring to FIG. 7, a transmitter 100 includes a precoder 110 and a plurality of Tx antennas 190-1, . . . , 190-Nt. A MIMO channel is formed between the transmitter 100 and a receiver 200. The receiver 200 includes a detector 210 and a plurality of Rx antennas 290-1, . . . , 290-Nr.

The precoder 110 receives R information symbols $s_1, \ldots, s_R$, and performs precoding on the R information symbols $s_1, \ldots, s_R$ to output Nt Tx symbols $z_1, \ldots, z_{Nt}$. The information symbol is a complex symbol corresponding to information. For example, the information symbol is a modulation symbol.

The transmitter 100 transmits the Nt Tx symbols $z_1, \ldots, z_{Nt}$ through the Nt Tx antennas 190-1, . . . , 190-Nt. The transmitter 100 can simultaneously transmit the R information symbols. That is, R denotes a rank.

Precoding can be expressed by Equation 1 below.

$$z = Q_{Nt \times R} s \qquad \text{[Equation 1]}$$

In Equation 1, $z=[z_1 \ldots z_{Nt}]^T$ denotes a Tx symbol vector, $Q_{Nt \times R}$ denotes a precoding matrix having a size of Nt×R, and $s=[s_1 \ldots s_R]^T$ denotes an information symbol vector. Nt denotes the number of Tx antennas, and R denotes a rank. If the rank is 1 (i.e., R=1), the precoding matrix is a column vector, and thus can be regarded as a precoding vector. Hereinafter, the precoding matrix is the concept of including the precoding vector.

The receiver 200 receives Nr Rx symbols $y_1, \ldots, y_{Nr}$ through Nr Rx antennas 290-1, . . . , 290-Nr.

The detector 210 estimates R information symbols $s_1, \ldots, s_R$ from the Nr Rx symbols $y_1, \ldots, y_{Nr}$ to detect R estimation symbols $x_1, \ldots, x_R$. An estimation symbol $x_i$ denotes a symbol by which an information symbol $s_i$ is estimated (where i=1, . . . , R). The detector 210 may detect the estimation symbol by using a detection scheme such as zero forcing (ZF), minimum mean square error (MMSE), maximum likelihood (ML), or the like.

The Nr Rx symbols $y_1, \ldots, y_{Nr}$ can be denoted by an Rx signal vector y, and can be expressed by Equation 2 below.

$$y = HQ_{Nt \times R} s + n \qquad \text{[Equation 2]}$$

In Equation 2, $y=[y_1 \ldots y_{Nr}]^T$ denotes an Rx signal vector, H denotes a MIMO channel matrix having a size of Nr×Nt, $Q_{Nt \times R}$ denotes a precoding matrix having a size of Nt×R, $s=[s_1 \ldots s_R]^T$ denotes an information symbol vector, and $n=[n_1 \ldots n_R]^T$ denotes a noise vector. Hereinafter, the matrix is the concept of including a column vector and a row vector.

It matters which precoding matrix will be used by the precoder 110. For example, the precoding matrix may be determined from a matrix which is decomposed from a MIMO channel matrix by using singular value decomposition (SVD).

The MIMO channel matrix can be decomposed by using the SVD as expressed by Equation 3 below.

$$H = UDV^H \qquad \text{[Equation 3]}$$

In Equation 3, U and V each denote a unitary matrix, and D denotes a diagonal matrix. $(\bullet)^H$ is a Hermitian matrix of $(\bullet)$.

When using the unitary matrix V as the precoding matrix, system performance can be improved. When the precoding matrix is determined by using the SVD scheme, Equation 2 can be changed to Equation 4 below.

$$\begin{aligned} U^H y &= U^H (HQ_{Nt \times R} s + n) \qquad \text{[Equation 4]} \\ &= U^H (UDV^H) Vs + U^H n \\ &= Ds + \tilde{n} \end{aligned}$$

In Equation 4, D denotes a diagonal matrix, and thus the receiver 200 can easily estimate an information symbol vector s. This is because a computational complexity is low.

When a unitary matrix decomposed from the MIMO channel matrix is used as a precoding matrix in the transmitter 100, system performance can be improved. However, the precoding matrix is not necessarily the unitary matrix. When using a precoding matrix suitable for a channel condition in addition to the unitary matrix, system performance can be improved. In order to use the precoding matrix suitable for the channel condition in the transmitter 100, the transmitter 100 must know channel state information (CSI) between the transmitter 100 and the receiver 200.

In general, the transmitter 100 cannot know the CSI. Therefore, the receiver 200 may estimate a channel and then feed back the CSI to the transmitter 100 through a feedback channel. The transmitter 100 may transmit information to the receiver 200 on the basis of the fed back CSI. Such an information transmission scheme is called a closed-loop scheme. The closed-loop scheme can improve system performance by transmitting information in a channel adaptive manner. However, a radio resource is required to feed back the CSI.

The transmitter 100 may transmit information to the receiver 200 without using the fed back CSI. Such an information transmission scheme is called an open-loop scheme. In case of the open-loop scheme, the receiver 200 may not feed back the CSI. Alternatively, the receiver 200 may feed back the CSI but may not use the CSI fed back from the transmitter 100.

The transmitter 100 may transmit information by using a codebook-based precoding scheme. The codebook is a set having a plurality of matrices as its element. The codebook is predetermined between the transmitter and the receiver. Each of the plurality of matrices within the codebook can be mapped to a codebook index in a one-to-one manner.

The receiver 200 may feed back the CSI. The fed back CSI may include a precoding matrix indicator (PMI). The PMI indicates a matrix within the codebook. The transmitter 100 selects the precoding matrix from within the codebook on the basis of the fed back CSI. The transmitter 100 may select the precoding matrix from within a subset of the codebook. The codebook-based precoding scheme alone is not sufficient to apply an optimal precoding matrix always. However, there is an advantage in that feedback overhead can be decreased.

Table 1 below shows an example of a codebook that can be used when the number Nt of Tx antennas is 2. However, this is for exemplary purposes only, and thus the codebook is not limited thereto.

TABLE 1

| Codebook index | Rank 1 | Rank 2 |
|---|---|---|
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

Referring to Table 1, if the number Nt of the Tx antennas is 2, the codebook includes 7 matrices in total. The codebook includes 4 matrices for a rank 1, and includes 3 matrices for a rank 2.

In case of using the open-loop scheme in LTE, a matrix corresponding to a codebook index 0 for the rank 2 is used as the precoding matrix. In case of using the Closed-loop scheme in the LTE, a matrix corresponding to a codebook index 0 is not used as the precoding matrix if the rank is 2. That is, in the LTE, an identity matrix is used only for the open-loop scheme. In the LTE, the total number of precoding matrices for the closed-loop scheme is 6.

Table 2 below shows an example of a codebook that can be used when the number Nt of Tx antennas is 4. However, this is for exemplary purposes only, and thus the codebook is not limited thereto.

TABLE 2

| Codebook index | $u_n$ | Rank 1 | Rank 2 | Rank 3 | Rank 4 |
|---|---|---|---|---|---|
| 0 | $u_0 = [1\ -1\ -1\ -1]^T$ | $W_0^{\{1\}}$ | $\dfrac{W_0^{\{14\}}}{\sqrt{2}}$ | $\dfrac{W_0^{\{124\}}}{\sqrt{3}}$ | $\dfrac{W_0^{\{1234\}}}{2}$ |
| 1 | $u_1 = [1\ -j\ 1\ j]^T$ | $W_1^{\{1\}}$ | $\dfrac{W_1^{\{12\}}}{\sqrt{2}}$ | $\dfrac{W_1^{\{123\}}}{\sqrt{3}}$ | $\dfrac{W_1^{\{1234\}}}{2}$ |
| 2 | $u_2 = [1\ 1\ -1\ 1]^T$ | $W_2^{\{1\}}$ | $\dfrac{W_2^{\{12\}}}{\sqrt{2}}$ | $\dfrac{W_2^{\{123\}}}{\sqrt{3}}$ | $\dfrac{W_2^{\{3214\}}}{2}$ |
| 3 | $u_3 = [1\ j\ 1\ -j]^T$ | $W_3^{\{1\}}$ | $\dfrac{W_3^{\{12\}}}{\sqrt{2}}$ | $\dfrac{W_3^{\{123\}}}{\sqrt{3}}$ | $\dfrac{W_3^{\{3214\}}}{2}$ |
| 4 | $u_4 = \left[1\ \dfrac{-1-j}{\sqrt{2}}\ -j\ \dfrac{1-j}{\sqrt{2}}\right]^T$ | $W_4^{\{1\}}$ | $\dfrac{W_4^{\{14\}}}{\sqrt{2}}$ | $\dfrac{W_4^{\{124\}}}{\sqrt{3}}$ | $\dfrac{W_4^{\{1234\}}}{2}$ |
| 5 | $u_5 = \left[1\ \dfrac{1-j}{\sqrt{2}}\ j\ \dfrac{-1-j}{\sqrt{2}}\right]^T$ | $W_5^{\{1\}}$ | $\dfrac{W_5^{\{14\}}}{\sqrt{2}}$ | $\dfrac{W_5^{\{124\}}}{\sqrt{3}}$ | $\dfrac{W_5^{\{1234\}}}{2}$ |
| 6 | $u_6 = \left[1\ \dfrac{1+j}{\sqrt{2}}\ -j\ \dfrac{-1+j}{\sqrt{2}}\right]^T$ | $W_6^{\{1\}}$ | $\dfrac{W_6^{\{13\}}}{\sqrt{2}}$ | $\dfrac{W_6^{\{134\}}}{\sqrt{3}}$ | $\dfrac{W_6^{\{1324\}}}{2}$ |
| 7 | $u_7 = \left[1\ \dfrac{-1+j}{\sqrt{2}}\ j\ \dfrac{1+j}{\sqrt{2}}\right]^T$ | $W_7^{\{1\}}$ | $\dfrac{W_7^{\{13\}}}{\sqrt{2}}$ | $\dfrac{W_7^{\{134\}}}{\sqrt{3}}$ | $\dfrac{W_7^{\{1324\}}}{2}$ |
| 8 | $u_8 = [1\ -1\ 1\ 1]^T$ | $W_8^{\{1\}}$ | $\dfrac{W_8^{\{12\}}}{\sqrt{2}}$ | $\dfrac{W_8^{\{124\}}}{\sqrt{3}}$ | $\dfrac{W_8^{\{1234\}}}{2}$ |
| 9 | $u_9 = [1\ -j\ -1\ -j]^T$ | $W_9^{\{1\}}$ | $\dfrac{W_9^{\{14\}}}{\sqrt{2}}$ | $\dfrac{W_9^{\{134\}}}{\sqrt{3}}$ | $\dfrac{W_9^{\{1234\}}}{2}$ |
| 10 | $u_{10} = [1\ 1\ 1\ -1]^T$ | $W_{10}^{\{1\}}$ | $\dfrac{W_{10}^{\{13\}}}{\sqrt{2}}$ | $\dfrac{W_{10}^{\{123\}}}{\sqrt{3}}$ | $\dfrac{W_{10}^{\{1234\}}}{2}$ |
| 11 | $u_{11} = [1\ j\ -1\ j]^T$ | $W_{11}^{\{1\}}$ | $\dfrac{W_{11}^{\{13\}}}{\sqrt{2}}$ | $\dfrac{W_{11}^{\{134\}}}{\sqrt{3}}$ | $\dfrac{W_{11}^{\{1324\}}}{2}$ |
| 12 | $u_{12} = [1\ -1\ -1\ 1]^T$ | $W_{12}^{\{1\}}$ | $\dfrac{W_{12}^{\{12\}}}{\sqrt{2}}$ | $\dfrac{W_{12}^{\{123\}}}{\sqrt{3}}$ | $\dfrac{W_{12}^{\{1234\}}}{2}$ |
| 13 | $u_{13} = [1\ -1\ 1\ -1]^T$ | $W_{13}^{\{1\}}$ | $\dfrac{W_{13}^{\{13\}}}{\sqrt{2}}$ | $\dfrac{W_{13}^{\{123\}}}{\sqrt{3}}$ | $\dfrac{W_{13}^{\{1234\}}}{2}$ |
| 14 | $u_{14} = [1\ 1\ -1\ -1]^T$ | $W_{14}^{\{1\}}$ | $\dfrac{W_{14}^{\{13\}}}{\sqrt{2}}$ | $\dfrac{W_{14}^{\{123\}}}{\sqrt{3}}$ | $\dfrac{W_{14}^{\{3214\}}}{2}$ |
| 15 | $u_{15} = [1\ 1\ 1\ 1]^T$ | $W_{15}^{\{1\}}$ | $\dfrac{W_{15}^{\{12\}}}{\sqrt{2}}$ | $\dfrac{W_{15}^{\{123\}}}{\sqrt{3}}$ | $\dfrac{W_{15}^{\{1234\}}}{2}$ |

Herein, $W_n^{\{s\}}$ denotes a matrix defined with columns determined by a set $\{s\}$ from the equation of $W_n = I - 2u_n u_n^H / u_n^H u_n$ (where $n=0, 1, \ldots, 15$). I denotes a 4×4 identity matrix, and a vector $u_n$ is given by the table. Referring to Table 2, when the number Nt of the Tx antennas is 4, the codebook includes 64 matrices in total.

In case of using the open-loop scheme in the LTE, matrices corresponding to codebook indices 12, 13, 14, and 15 are used as the precoding matrix. A BS cyclically applies the matrices to information transmitted through a PUSCH. In the LTE, the precoding matrix for the open-loop scheme is agreed in advance between the transmitter and the receiver. As such, a matrix within the codebook can be used as the precoding matrix for the open-loop scheme. However, this is only an example of the open-loop type precoding, and thus the open-loop type precoding matrix is not limited thereto.

The codebook can be configured to have the following characteristics. However, this is only for showing exemplary characteristics of the codebook, and thus the codebook is not limited thereto.

(1) Constant modulus: Each element of any matrix within a codebook has the same size other than '0'.

(2) Nested property: A lower rank matrix is designed to be configured with a subset of a specific column of a higher rank matrix.

(3) Constrained alphabet: An alphabet of each element of any matrix within a codebook is configured with {±1, ±j, ±(1+j)/sqrt(2), ±(−1+j)/sqrt(2).

Figure 8:
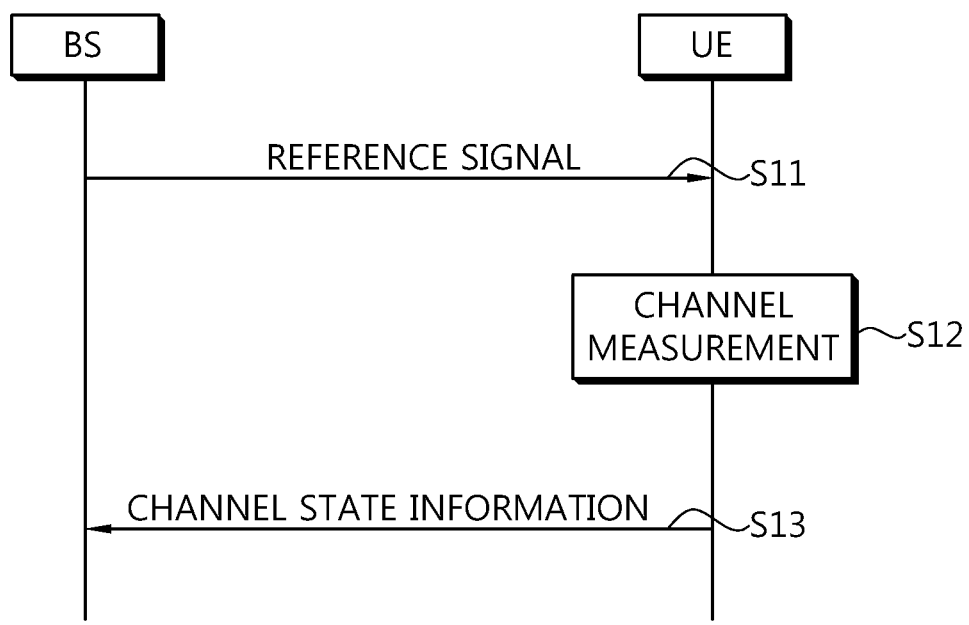
FIG. 8 is a flowchart showing an example of a method of transmitting channel state information.

FIG. 8 is a flowchart showing an example of a method of transmitting channel state information (CSI).

Referring to FIG. 8, a BS transmits a reference signal (RS) to a UE (step S11). The RS is a signal known for channel estimation to both the BS and the UE. The RS may also be called a pilot. The RS for channel estimation may be a common RS transmitted to all UEs within a cell. The common RS may differ from one cell to another in order to avoid inter-cell collision. In this case, the common RS is a cell-specific RS. An example of the RS for channel estimation includes a CSI-RS.

The UE measures a channel on the basis of the RS (step s12). The UE feeds back the CSI to the BS (step S13). The CSI implies general information on the channel, and does not have a particular restriction. The CSI may include a channel quality indicator (CQI), a PMI, and a rank indicator (RI). The CQI indicates a modulation coding scheme (MCS) suitable for the channel. The PMI indicates a codebook index suitable for the channel. The RI indicates a rank of the channel.

The CSI may be fed back for a full band, or may be fed back for a subband which is a part of the full band. For example, the subband is a specific number of resource blocks. The subband may be selected by the UE, or may be determined by using higher layer signaling such as radio resource control (RRC) signaling.

The CSI may be transmitted periodically. For example, the UE may transmit the CSI periodically through a PUCCH. Alternatively, the CSI may be transmitted non-periodically at the request of the BS. For example, when the BS requests the CSI in a UL grant, the UE may transmit the CSI non-periodically through the PUSCH.

When using a frequency division duplex (FDD) scheme, the BS can know a DL channel property. Therefore, the UE feeds back the CSI for the DL channel property. The BS may use the fed back CSI in DL transmission. When using a time division duplex (TDD) scheme, a UL channel property and the DL channel property have almost reciprocal channel reciprocity. In case of using the TDD scheme, the UE can also feed back the CSI for the DL channel property.

Hereinafter, a structure of a transmitter for transmitting information by using precoding will be described in detail. A MIMO-OFDM system may have one or a plurality of codewords in a space domain according to a rank. The codeword denotes a coded bit obtained by performing channel coding on an information bit. A single codeword (SCW) structure is used when one codeword is present in the space domain. A multiple codeword (MCS) structure is used when a plurality of codewords are present in the space domain.

Figure 9:
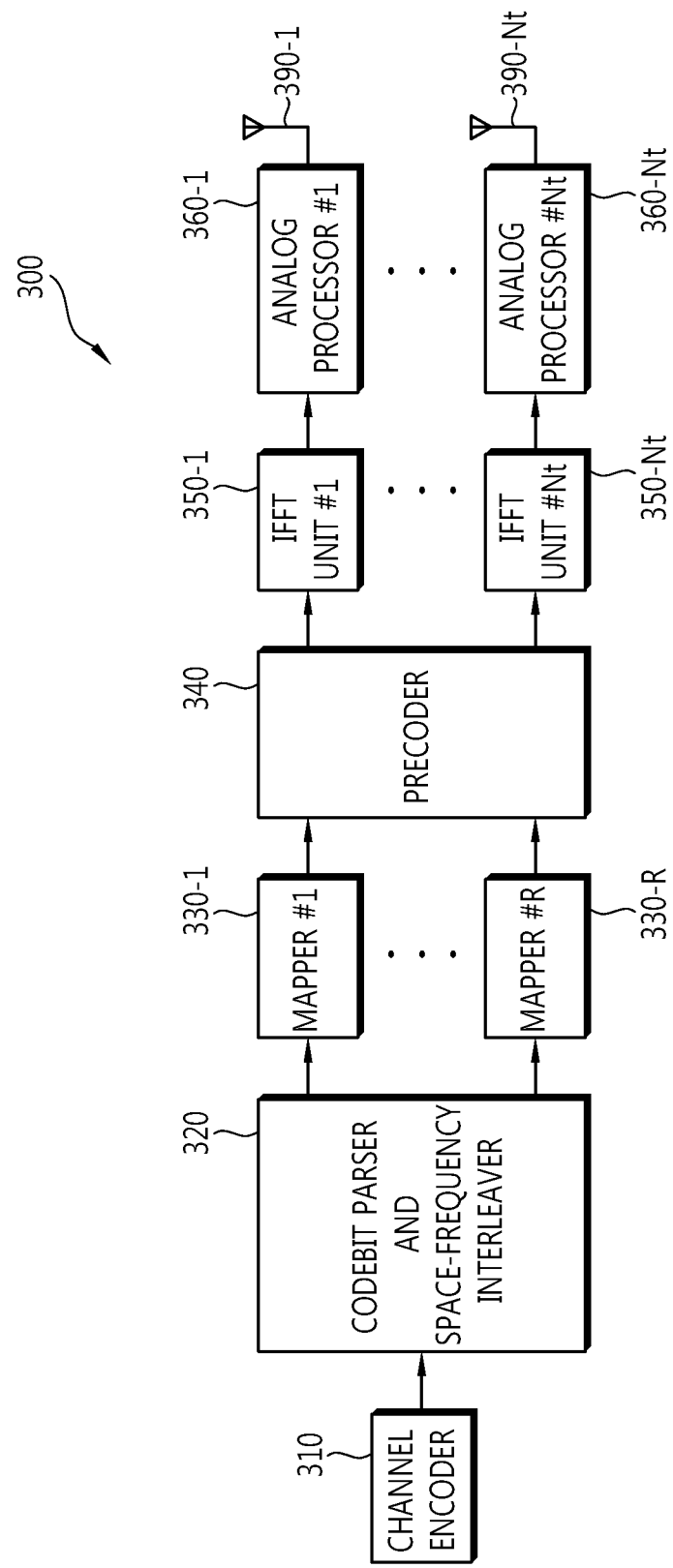
FIG. 9 is a block diagram showing an exemplary structure of a transmitter having a single codeword.

FIG. 9 is a block diagram showing an exemplary structure of a transmitter having a single codeword. Herein, the transmitter may be a part of a UE or a BS.

Referring to FIG. 9, a transmitter 300 includes a channel encoder 310, a codebit parse and space-frequency interleaver 320, a plurality of mappers 330-1, . . . , 330-R, a precoder 340, a plurality of inverse fast Fourier transform (IFFT) units 350-1, . . . , 350-Nt, a plurality of analog processors 360-1, . . . , 360-Nt, and a plurality of Tx antennas 390-1, . . . , 390-Nt.

The channel encoder 310 is coupled to the codebit parse and space-frequency interleaver 320. The codebit parse and space-frequency interleaver 320 is coupled to the plurality of mappers 330-1, . . . , 330-R. The plurality of mappers 330-1, . . . , 330-R are coupled to the precoder 340. The precoder 340 is coupled to the plurality of IFFT units 350-1, . . . , 350-Nt. The plurality of IFFT units 350-1, . . . , 350-Nt are respectively coupled to the plurality of analog processors 360-1, . . . , 360-Nt. The plurality of analog processors 360-1, . . . , 360-Nt are respectively coupled to the plurality of Tx antennas 390-1, . . . , 390-Nt. That is, an IFFT unit #n 350-$n$ is coupled to an analog processor #n 360-$n$, and the analog processor #n 360-$n$ is coupled to a Tx antenna #n 390-$n$ (where n=1, . . . , Nt).

The codebit parse and space-frequency interleaver 320 parses a coded bit input from the channel encoder 310, and generates an interleaved bit by performing interleaving across frequency resources and Tx antennas for the respective parsed coded bits. The interleaved bits are respectively input to the plurality of mappers 330-1, . . . , 330-R. The plurality of mappers 330-1, . . . , 330-R output respective spatial streams. Each spatial stream consists of one or a plurality of complex symbols. For example, the complex symbol is a modulation symbol. Herein, R denotes a rank.

The precoder 340 performs precoding on R spatial streams to generate Nt Tx streams. Each Tx stream may consist of a specific number of symbols, where the specific number is equal to the number of spatial streams.

The Tx streams may be sequentially mapped to resource elements within a resource block allocated for information transmission. One complex symbol may be mapped to one resource element. In case of multiple-antenna transmission, there is one resource grid (see FIG. 3) defined for each Tx antenna.

One or more resource blocks may be allocated to the transmitter 300 for information transmission. When a plurality of resource blocks are allocated, the plurality of resource blocks may be allocated either continuously or non-continuously. Herein, the resource block may be a physical resource block or a virtual resource block. The physical resource block includes subcarriers physically localized in a frequency domain. The virtual resource block includes subcarriers physically distributed in the frequency domain. There is no particular restriction on a distribution method of the subcarriers included in the virtual resource block.

For every OFDM symbol within the resource block, each of the plurality of IFFT units 350-1, . . . , 350-Nt generates a time-continuous OFDM signal. The time-continuous OFDM signal is also called an OFDM baseband signal. Each of the plurality of IFFT units 350-1, . . . , 350-Nt may generate an OFDM signal by performing IFFT, CP insertion, or the like on each OFDM symbol.

The plurality of analog processors 360-1, . . . , 360-Nt generate radio signals by processing OFDM baseband signals for the respective Tx antennas 390-1, . . . , 390-Nt. The OFDM baseband signal can be converted to a radio signal by performing up-conversion at a carrier frequency. The carrier frequency is also called a center frequency. The transmitter 300 can support both a single-carrier system and a multiple-carrier system. In addition to the up-conversion, the radio signal may be generated by performing amplification, filtering, or the like. The radio signal is transmitted through each of the plurality of Tx antennas 390-1, . . . , 390-Nt.

As such, one codeword can be used for all spatial layers.

Figure 10:
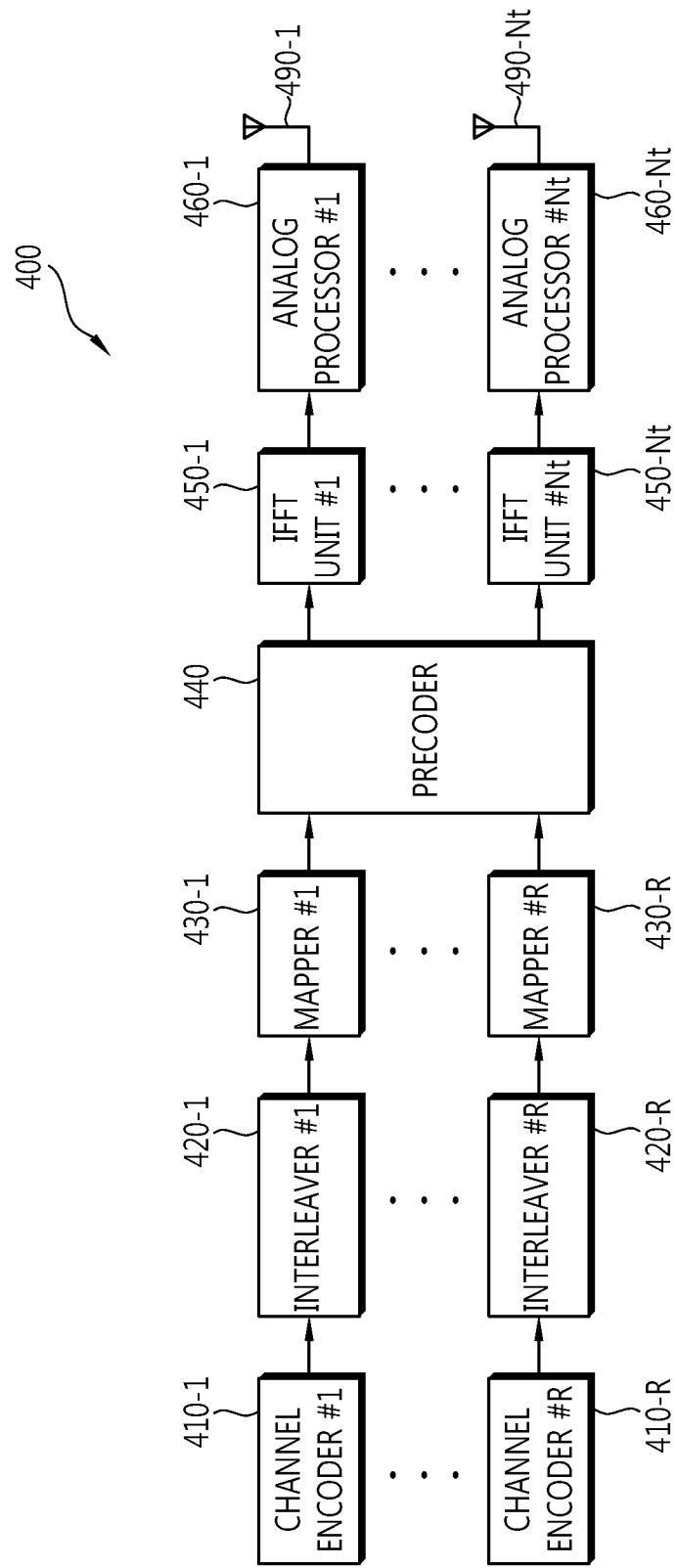
FIG. 10 is a block diagram showing an exemplary structure of a transmitter having multiple codewords.

FIG. 10 is a block diagram showing an exemplary structure of a transmitter having multiple codewords. Herein, the transmitter may be a part of a UE or a BS.

Referring to FIG. 10, a transmitter 400 includes a plurality of channel encoders 410-1, . . . , 410-R, a plurality of interleavers 420-1, . . . , 420-R, a plurality of mappers 430-1, . . . , 430-R, a precoder 440, a plurality of IFFT units 450-1, . . . , 450-Nt, a plurality of analog processors 460-1, . . . , 460-Nt, and a plurality of Tx antennas 490-1, . . . , 490-Nt.

The plurality of channel encoders 410-1, . . . , 410-R are respectively coupled to the plurality of interleavers 420-1, . . . , 420-R. The plurality of interleavers 420-1, . . . , 420-R are respectively coupled to the plurality of mappers 430-1, . . . , 430-R. The plurality of mappers 430-1, . . . , 430-R are coupled to the precoder 440. That is, a channel encoder #m 410-r is coupled to an interleaver #m 420-r, and the interleaver #r 420-r is coupled to a mapper #r 430-r.

The precoder 440 is coupled to the plurality of IFFT units 450-1, . . . , 450-Nt. The plurality of IFFT units 450-1, . . . , 450-Nt are respectively coupled to the plurality of analog processors 460-1, . . . , 460-Nt. The plurality of analog processors 460-1, . . . , 460-Nt are respectively coupled to the plurality of Tx antennas 490-1, . . . , 490-Nt. That is, an IFFT unit #n 450-n is coupled to an analog processor #n 460-n, and the analog processor #n 460-n is coupled to a Tx antenna #n 490-n (where n=1, . . . , Nt).

As such, a codeword for each layer can be used. In addition thereto, the description on the transmitter 300 of FIG. 7 can also be applied to the transmitter 400 having the multiple codeword structure.

Figure 11:
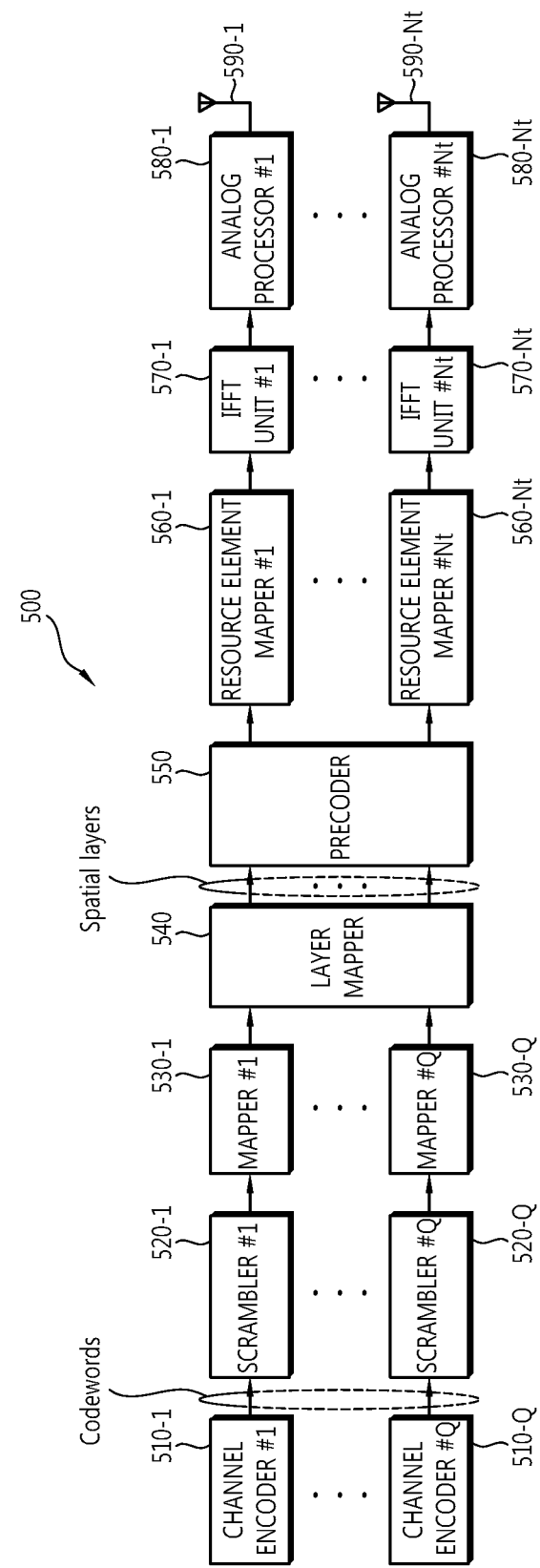
FIG. 11 is a block diagram showing an exemplary structure of a transmitter.

FIG. 11 is a block diagram showing an exemplary structure of a transmitter. Herein, the transmitter may be a part of a UE or a BS.

Referring to FIG. 11, a transmitter 500 includes a plurality of channel encoders 510-1, . . . , 510-Q, a plurality of scramblers 520-1, . . . , 520-Q, a plurality of mappers 530-1, . . . , 530-Q, a layer mapper 540, a precoder 550, a plurality of resource element mappers 560-1, . . . , 560-Nt, a plurality of IFFT units 570-1, . . . , 570-Nt, a plurality of analog processors 580-1, . . . , 580-Nt, and a plurality of Tx antennas 590-1, . . . , 590-Nt.

The plurality of channel encoders 510-1, . . . , 510-Q are respectively coupled to the plurality of scramblers 520-1, . . . , 520-Q. The plurality of scramblers 520-1, . . . , 520-Q are respectively coupled to the plurality of mappers 530-1, . . . , 530-Q. The plurality of mappers 530-1, . . . , 530-Q are coupled to the layer mapper 540. The layer mapper 540 is coupled to the precoder 550. That is, a channel encoder #q 510-q is coupled to a scrambler #q 520-q, and the scrambler #q 520- is coupled to a mapper #q 530-q (where q=1, . . . , Q). Q denotes the number of codewords. Up to two codewords are supplied in LTE. Therefore, Q is 1 or 2 in the LTE.

The precoder 550 is coupled to the plurality of resource element mappers 560-1, . . . , 560-Nt. The plurality of resource element mappers 560-1, . . . , 560-Nt are respectively coupled to the plurality of IFFT units 570-1, . . . , 570-Nt. The plurality of IFFT units 570-1, . . . , 570-Nt are respectively coupled to the plurality of analog processors 580-1, . . . , 580-Nt. The plurality of analog processors 580-1, . . . , 580-Nt are respectively coupled to the plurality of Tx antennas 590-1, . . . , 590-Nt. That is, a resource element mapper #n 560-n is coupled to an IFFT unit #n 570-n, the IFFT unit #n 570-n is coupled to an analog processor #n 580-n, and the analog processor #n 580-n is coupled to a Tx antenna #n 580-n (where n=1, . . . , Nt). Nt is 2 or 4 when a precoding scheme is applied in the LTE.

Each of the plurality of scramblers 520-1, . . . , 520-Q generates a scrambled bit by scrambling a scrambling sequence and a coded bit for each codeword.

The plurality of mappers 530-1, . . . , 530-Q generate modulation symbols for respective codewords. The layer mapper 540 maps the modulation symbols for the respective codewords to R spatial layers. The modulation symbols can be mapped to the spatial layers in various manners. Accordingly, R spatial streams are generated. Herein, R denotes a rank. The rank R may be equal to or greater than Q which denotes the number of codewords. The number Nt of Tx antennas is equal to or less than the rank R.

The spatial stream is denoted by $s_r(1), s_r(2), \ldots, s_r(M)$ (where r=1, . . . , R). Herein, M denotes the number of complex symbols per spatial stream. An information symbol vector is denoted by $s(k)=[s_1(k) \ldots s_R(k)]^T$ (where k=1, . . . , M).

The precoder 550 may perform precoding by multiplying a precoding matrix $Q_{Nt \times R}(k)$ having an Nt×R size and the information symbol vector s(k) to output a Tx symbol vector $z(k)=[z_1(k) \ldots z_{Nt}(k)]^T$ (where k=1, . . . , M). The Tx stream is denoted by $z_n(1), z_n(2), \ldots, z_n(M)$ (where n=1, . . . , Nt).

The resource element mapper #n 560-n maps the Tx stream $z_n(k)$ sequentially to resource elements within a resource block (where k=1, . . . , M). An index k is an index indicating an order of complex symbols that constitute a spatial stream (or a Tx stream). Alternatively, the index k may imply an index indicating a resource element within a resource block. Alternatively, the index k may imply an index indicating a subcarrier within an OFDM symbol. Hereinafter, the index k may be an index indicating a time-frequency resource to which a Tx symbol is mapped. The time-frequency resource may be a subcarrier, a resource element, a resource group, or the like. The precoding matrix may vary depending on the index k.

An information transmission apparatus and method using a codebook-based precoding scheme have been described above. An LTE system supports up to 4 Tx antennas in DL transmission. Therefore, a codebook for 2 Tx antennas and a codebook for 4 Tx antennas are already prepared in the LTE system (see Table 1 and Table 2). On the other hand, it is considered that up to 8 Tx antennas are supported in DL transmission when using an LTE-A system.

As such, if the number of Tx antennas increases in comparison with the legacy system, a precoding matrix for the increased Tx antennas needs to be reconfigured by using a codebook which is already prepared.

Hereinafter, a method of configuring a precoding matrix for Mt Tx antennas on the basis of a codebook for Nt Tx antennas will be described (where Nt<Mt).

When the number of Tx antennas increases, a maximum rank can also increase. $N_{rank}$ denotes a maximum rank for the Nt Tx antennas, and $M_{rank}$ denotes a maximum rank for the Mt Tx antennas. If there is no particular restriction on the number of Rx antennas, $N_{rank}$ may be equal to Nt, and $M_{rank}$ may be equal to Mt.

Hereinafter, $P_{Mt \times R}(k)$ denotes a precoding matrix having a size of Mt×R for the Mt Tx antennas (where R=1, . . . , $M_{rank}$). A codebook for the Nt Tx antennas consists of a specific number of matrices having an Nt×r size for each rank r (where r=1, . . . , $N_{rank}$). The codebook may consist of a different number of matrices for each rank r. Alternatively, the codebook may consist of the same number of matrices irrespective of the rank r.

The precoding matrix $P_{Mt \times R}(k)$ having a size of Mt×R is generated based on at least one element matrix. Hereinafter, the element matrix denotes a matrix selected from a codebook for the Nt Tx antennas and used to generate the precoding matrix having a size of Mt×R.

An element matrix $Q_{Nt \times r}(k)$ having a size of Nt×r is selected from within the codebook as expressed by Equation 5 below.

$$Q_{Nt \times r}(k) \in \{Q_{Nt \times r}^1, Q_{Nt \times r}^2, Q_{Nt \times r}^3, \ldots, Q_{Nt \times r}^C\} \quad \text{[Equation 5]}$$

In Equation 5, C denotes the number of matrices in a codebook for the Nt Tx antennas in case of the rank r.

The codebook for the Nt Tx antennas may be configured variously. There is no particular restriction on the codebook. For example, the codebook may be prepared in the format of Table 1 and/or Table 2.

The precoding matrix can be split into a plurality of sub-matrices. The sub-matrix implies a matrix which is configured by selecting a specific row and column from a bigger matrix.

An Nt×r sized sub-matrix of the Mt×R sized precoding matrix $P_{Mt \times R}(k)$ may be generated based on the Nt×r sized element matrix. In this case, (Mt−Nt) rows and (R−r) columns of the precoding matrix have to be additionally configured. They can be configured variously as follows.

First, a case where the rank R of the precoding matrix is equal to or less than $N_{rank}$ will be described.

If Mt is equal to 2Nt, an example of the precoding matrix $P_{Mt \times R}(k)$ can be expressed by Equation 6 below.

$$P_{Mt \times R}(k) = \begin{pmatrix} w_1(k) \cdot Q_{1, Nt \times R}(k) \\ w_2(k) \cdot Q_{2, Nt \times R}(k) \end{pmatrix} \quad \text{[Equation 6]}$$

or $$P_{Mt \times R}(k) = \begin{pmatrix} Q_{1, Nt \times R}(k) \cdot w_1(k) \\ Q_{2, Nt \times R}(k) \cdot w_2(k) \end{pmatrix}$$

In Equation 6, $Q_{1, Nt \times R}(k)$ denotes a $1^{st}$ element matrix, $Q_{2, Nt \times R}(k)$ denotes a $2^{nd}$ element matrix, $w_1(k)$ denotes a $1^{st}$ weighting matrix, and $w_2(k)$ denotes a $2^{nd}$ weighting matrix. Alternatively, each of $w_1(k)$ and $w_2(k)$ may not be a matrix but a scalar weight which is a scalar multiple of the element matrix.

Each of the $1^{st}$ element matrix and the $2^{nd}$ element matrix is selected from within the codebook for the Nt Tx antennas. The $1^{st}$ element matrix and the $2^{nd}$ element matrix are selected from within the same codebook.

The weighting matrix is a matrix to be multiplied to an Nt×R sized element matrix. The weighting matrix may have a size of Nt×Nt or R×R. For convenience of explanation, it is assumed hereinafter that the weighting matrix has a size of Nt×Nt. The weighting matrix may be used for normalization. Alternatively, the weighting matrix may be used as an element matrix of the precoding matrix.

There is no particular restriction on the weighting matrix. The weighting matrix may be configured in a predetermined manner according to the size of the element matrix. Alternatively, the weighting matrix may be configured in a predetermined manner according to the rank R or the number Mt of the Tx antennas. The weighting matrix may vary according to the index k or may not vary.

For example, the weighting matrix may be configured in a diagonal matrix format. An example of an Nt×Nt sized weighting matrix $w_i(k)$ can be expressed by Equation 7 below.

$$w_i(k) = \begin{pmatrix} a_{1,i}(k) \cdot \exp(jd_{1,i}(k)) & 0 & \cdots & 0 \\ 0 & a_{2,i}(k) \cdot \exp(jd_{2,i}(k)) & \cdots & 0 \\ \vdots & \vdots & \ddots & 0 \\ 0 & 0 & \cdots & a_{Nt,i}(k) \cdot \exp(jd_{Nt,i}(k)) \end{pmatrix} \quad \text{[Equation 7]}$$

In Equation 7, $a_{n,i}(k)$ denotes a weight magnitude of an $n^{th}$ row, and $d_{n,i}(k)$ denotes a weight phase of the $n^{th}$ row (where $a_{n,i}(k) \geq 0$, $0 \leq d_{n,i}(k) < 2\pi$, n=1, 2, . . . , Nt). Herein, i denotes an index indicating an element matrix to which the weighting matrix is multiplied.

As such, when Mt is equal to 2Nt, the Mt×R sized precoding matrix can be split into a $1^{st}$ sub-matrix having a size of Nt×R and a $2^{nd}$ sub-matrix having a size of Nt×R. In this case, the precoding matrix is split only in a row direction. The $1^{st}$ sub-matrix can be generated based on a $1^{st}$ element matrix having a size of Nt×R, and the $2^{nd}$ sub-matrix can be generated based on a $2^{nd}$ element matrix having a size of Nt×R. This can also be applied not only to a case where Mt is equal to 2Nt but also to a case where Mt is a multiple of Nt. If Mt is mNt, the Mt×R sized precoding matrix can be split in a row direction to m sub-matrices having a size of Nt×R. Each of the m sub-matrices can be generated based on an element matrix.

However, a problem arises when R is greater than $N_{rank}$. This is because, even if the sub-matrix of the precoding matrix is generated based on a plurality of element matrices having a size of Nt×$N_{rank}$ for example, (R−$N_{rank}$) columns have to be additionally configured.

If Mt is equal to 2Nt, another example of the precoding matrix $P_{Mt \times R}(k)$ can be expressed by Equation 8 below.

$$P_{Mt \times R}(k) = \begin{pmatrix} w_1(k) \cdot Q_{1, Nt \times (R-x)}(k) & w_3(k) \cdot Q_{3, Nt \times x}(k) \\ w_2(k) \cdot Q_{2, Nt \times (R-x)}(k) & w_4(k) \cdot Q_{4, Nt \times x}(k) \end{pmatrix} \quad \text{[Equation 8]}$$

In Equation 8, x satisfies $0 < x \leq N_{rank}$, and (R−x) satisfies $0 < R - x \leq N_{rank}$. In this case, the rank R of the precoding matrix satisfies $2 \leq R \leq 2N_{rank}$. Even if the rank R is less than or equal to $N_{rank}$, the precoding matrix can be generated as expressed by Equation 8 above.

As such, if Mt is equal to 2Nt, an Mt×R sized precoding matrix can be split into two sub-matrices having a size of Nt×(R−x) and two sub-matrices having a size of Nt×x. This may be the same as a precoding matrix split in a row direction and a column direction. Each of the plurality of sub-matrices can be generated based on an element matrix. Accordingly, the rank R of the precoding matrix can be extended up to $2N_{rank}$. Although the precoding matrix is split one time in the column direction herein, the precoding matrix can also be split several times in the column direction. If the precoding matrix is split several times in the column direction, the same can also apply to a case where the rank R is greater than $2N_{rank}$. Likewise, if the precoding matrix is split several times in the row direction, the same can also apply to a case where Mt is a multiple of Nt.

However, if each of the plurality of sub-matrices is generated based on a different element matrix, system overhead may increase. Therefore, Equation 8 can be changed to Equation 9 below.

$$P_{Mt \times R}(k) = \begin{pmatrix} w_1(k) \cdot Q_{1,Nt \times (R-x)}(k) & w_3(k) \cdot Q_{1,Nt \times x}(k) \\ w_2(k) \cdot Q_{2,Nt \times (R-x)}(k) & w_4(k) \cdot Q_{2,Nt \times x}(k) \end{pmatrix}$$ [Equation 9]

In Equation 9, $Q_{m,Nt \times x}(k)$ can be configured with a column subset of $Q_{m,Nt \times (R-x)}(k)$ (where m=1, 2). Alternatively, $Q_{m,Nt \times (R-x)}(k)$ can be configured with a column subset of $Q_{m,Nt \times x}(k)$ (where m=1, 2).

For convenience of explanation, it is assumed hereinafter that (R−x) is greater than x, and $Q_{m,Nt \times x}(k)$ is configured with a column subset of $Q_{m,Nt \times (R-x)}(k)$. $Q_{1,Nt \times (R-x)}(k)$ is a $1^{st}$ element matrix, and $Q_{2,Nt \times (R-x)}(k)$ is a $2^{nd}$ element matrix. $Q_{1,Nt \times x}(k)$ is configured with a column subset of the $1^{st}$ element matrix, and $Q_{2,Nt \times x}(k)$ is configured with a column subset of the $2^{nd}$ element matrix.

There is no particular restriction on which column of the element matrix is selected. A case where x is 2 and R is 6 will be described for example. $Q_{m,Nt \times 2}(k)$ may be configured with $1^{st}$ and $4^{th}$ columns of an $m^{th}$ element matrix. That is, $Q_{1,Nt \times 2}(k)$ and $Q_{2,Nt \times 2}(k)$ may be configured with column subsets in the same location of $Q_{1,Nt \times 4}(k)$ and $Q_{2,Nt \times 4}(k)$, respectively. Alternatively, $Q_{1,Nt \times 2}(k)$ may be configured with $1^{st}$ and $4^{th}$ column of the $1^{st}$ element matrix, and $Q_{2,Nt \times 2}(k)$ may be configured with $2^{nd}$ and $3^{rd}$ columns of the $2^{nd}$ element matrix. That is, $Q_{1,Nt \times 2}(k)$ and $Q_{2,Nt \times 2}(k)$ may be configured with column subsets in different locations of $Q_{1,Nt \times 4}(k)$ and $Q_{2,Nt \times 4}(k)$, respectively.

A codebook for the Nt Tx antennas may indicate a matrix for each rank by using one codebook index (see Table 1 and Table 2). In this case, $Q_{m,Nt \times x}(k)$ and $Q_{m,Nt \times (R-x)}(k)$ may be respectively a matrix with a rank x and a matrix with a rank (R−x) each of which are indicated by the same codebook index.

The weighting matrix can be changed as expressed by Equation 10 below.

$$P_{Mt \times R}(k) = \begin{pmatrix} w_1(k) \cdot Q_{1,Nt \times (R-x)}(k) & w_1(k) \cdot Q_{1,Nt \times x}(k) \\ w_2(k) \cdot Q_{2,Nt \times (R-x)}(k) & -w_2(k) \cdot Q_{2,Nt \times x}(k) \end{pmatrix}$$ [Equation 10]

The precoding matrix generated by Equation 10 above may be a unitary matrix.

As such, the sub-matrices constituting the same row of the precoding matrix can be generated based on the same element matrix, and the sub-matrices constituting different rows can be generated based on different element matrices.

When the sub-matrices constituting the different rows of the precoding matrix are generated based on respective different element matrices, it is called a row expansion scheme. Likewise, when the sub-matrices constituting the different columns of the precoding matrix are generated based on respective different element matrices, it is called a column expansion scheme.

Equation 11 shows an example in which the precoding matrix $P_{Mt \times R}(k)$ is generated based on the column expansion scheme.

$$P_{Mt \times R}(k) = \begin{pmatrix} w_1(k) \cdot Q_{1,Nt \times (R-x)}(k) & w_3(k) \cdot Q_{2,Nt \times x}(k) \\ w_2(k) \cdot Q_{1,Nt \times (R-x)}(k) & w_4(k) \cdot Q_{2,Nt \times x}(k) \end{pmatrix}$$ [Equation 11]

As such, the Mt×R size precoding matrix can be split into a plurality of sub-matrices. Each of the plurality of sub-matrices of the precoding matrix described up to now is generated based on a matrix selected from within the codebook for the Nt Tx antennas. Hereinafter, the sub-matrix of the precoding matrix generated based on the matrix selected from within the codebook is called a codebook-based sub-matrix.

However, if all of the sub-matrices constituting the precoding matrix are codebook-based sub-matrices, system overhead may increase. Since a CSI corresponding to each sub-matrix has to be fed back, feedback overhead may increase. Therefore, among the sub-matrices constituting the precoding matrix, one or more sub-matrices can be generated as a codebook-based sub-matrix while the remaining sub-matrices are generated by using another method. Hereinafter, a sub-matrix except for the codebook-based sub-matrix among the plurality of sub-matrices is called a residue sub-matrix.

Equation 12 below shows another example of the Mt×R sized precoding matrix $P_{Mt \times R}(k)$.

$$P_{Mt \times R}(k) = \begin{pmatrix} w_1(k) \cdot Q_{1,Nt \times R}(k) \\ C_{(Mt-Nt) \times R}(k) \end{pmatrix}$$ [Equation 12]

or $$P_{Mt \times R}(k) = \begin{pmatrix} C_{(Mt-Nt) \times R}(k) \\ w_1(k) \cdot Q_{1,Nt \times R}(k) \end{pmatrix}$$

In Equation 12, C(k) denotes a residue sub-matrix having a size of (Mt−Nt)×R.

A matrix having a format not requiring a feedback is used as the residue sub-matrix. Therefore, the residue sub-matrix may use the open-loop precoding scheme. The residue sub-matrix may be a predetermined fixed matrix or a matrix predetermined according to the index k. If (Mt−Nt) is equal to Nt, the residue sub-matrix may be a matrix predetermined within the codebook.

For example, the residue sub-matrix may be a zero matrix of which all elements are '0'. If the residue sub-matrix is the zero matrix, only a particular Tx antenna can be selected from the Mt Tx antennas and can be used in information transmission. That is, there is an effect of antenna selection. In this case, a constant modulus characteristic of the precoding matrix is not satisfied.

The number Mt−Nt of rows of the residue sub-matrix may vary depending on the number Mt of Tx antennas. Therefore, the precoding matrix can be generated even if Mt is not a multiple of Nt.

Although the precoding matrix includes one residue sub-matrix in the above equation, the precoding matrix may include a plurality of residue sub-matrices.

Table 3 below shows various exemplary formats of an Mt×R sized precoding matrix including a residue sub-matrix.

TABLE 3

| (1) | $\begin{pmatrix} w_1(k) \cdot Q_{1,Nt \times (R-x)}(k) & C_{Nt \times x} \\ C_{Nt \times (R-x)} & w_2(k) \cdot Q_{2,Nt \times x}(k) \end{pmatrix}$ |
|---|---|
| (2) | $\begin{pmatrix} C_{Nt \times (R-x)} & w_2(k) \cdot Q_{2,Nt \times x}(k) \\ w_1(k) \cdot Q_{1,Nt \times (R-x)}(k) & C_{Nt \times x} \end{pmatrix}$ |

TABLE 3-continued (3) $$\begin{pmatrix} w_1(k) \cdot Q_{1,Nt\times(R-x)}(k) & w_2(k) \cdot Q_{2,Nt\times x}(k) \\ C_{Nt\times(R-x)} & C_{Nt\times x} \end{pmatrix}$$

(4) $$\begin{pmatrix} C_{Nt\times(R-x)} & C_{Nt\times x} \\ w_1(k) \cdot Q_{1,Nt\times(R-x)}(k) & w_2(k) \cdot Q_{2,Nt\times x}(k) \end{pmatrix}$$

(5) $$\begin{pmatrix} w_1(k) \cdot Q_{1,Nt\times(R-x)} & C_{Nt\times x} \\ C_{Nt\times(R-x)} & C_{Nt\times x} \end{pmatrix}$$

(6) $$\begin{pmatrix} C_{Nt\times(R-x)} & C_{Nt\times x} \\ w_1(k) \cdot Q_{1,Nt\times(R-x)}(k) & C_{Nt\times x} \end{pmatrix}$$

(7) $$\begin{pmatrix} C_{Nt\times(R-x)} & w_1(k) \cdot Q_{1,Nt\times x}(k) \\ C_{Nt\times(R-x)} & C_{Nt\times x} \end{pmatrix}$$

(8) $$\begin{pmatrix} C_{Nt\times(R-x)} & C_{Nt\times x} \\ C_{Nt\times(R-x)} & w_1(k) \cdot Q_{1,Nt\times x}(k) \end{pmatrix}$$

(9) $$\begin{pmatrix} w_1(k) \cdot Q_{1,Nt\times(R-x)}(k) & C_{Nt\times x} \\ w_2(k) \cdot Q_{2,Nt\times(R-x)}(k) & C_{Nt\times x} \end{pmatrix}$$

(10) $$\begin{pmatrix} C_{Nt\times(R-x)} & w_1(k) \cdot Q_{1,Nt\times x}(k) \\ C_{Nt\times(R-x)} & w_2(k) \cdot Q_{2,Nt\times x}(k) \end{pmatrix}$$

As shown in Table 3 above, the precoding matrix may have various formats. The precoding matrix may have only any one of the various formats. Alternatively, the precoding matrix may optionally have several formats at the same time. In addition, the precoding matrix may have a different format according to a UE and/or a BS. The precoding matrix formats of Table 3 above are for exemplary purposes only, and thus the present invention is not limited thereto.

It is assumed in the above description that, if a plurality of codebook-based sub-matrices are used, each of the plurality of codebook-based sub-matrices uses the same codebook. However, a different codebook may be used by each of the plurality of codebook-based sub-matrix. For example, a $1^{st}$ codebook for Nt Tx antennas and a $2^{nd}$ codebook for Lt Tx antennas may be used (where Lt<Mt). For example, the $1^{st}$ codebook may be the same as shown in Table 2 (i.e., Nt=4), and the $2^{nd}$ codebook may be the same as shown in Table 1 (i.e., Lt=2).

In summary, an Mt×R sized precoding matrix can be split into a plurality of sub-matrices. At least one of the plurality of sub-matrices is a codebook based sub-matrix having a size of Nt×r. The remaining (Mt−Nt) rows and (R−r) columns of the precoding matrix may be a codebook based sub-matrix and/or a residue sub-matrix. The tables and equations above are only examples of the precoding matrix formats.

It has been described up to now that the codebook based sub-matrix having a size of Nt×r is generated based on an Nt×Nt sized weighting matrix and an Nt×r sized element matrix. That is, the codebook based sub-matrix has the same size as the element matrix. However, this is for exemplary purposes only, and thus the size of the codebook based sub-matrix can be changed by regulating the size of the weighting matrix. In this case, the precoding matrix can also be generated in various formats.

Although a method of generating a precoding matrix has been described up to now, the present invention is not limited thereto. Thus, the precoding matrix can be generated in various manners. The precoding matrix can be generated by various combinations of one or more element matrices, weighting matrices, residue matrices, etc. In this case, the combination may imply a product of matrices, a sub-matrix of the precoding matrix, etc. That is, the precoding matrix is generated based on a plurality of matrices while one of the plurality of matrices is selected from within a codebook for Nt antennas.

Hereinafter, a case where a precoding matrix is generated based on a $1^{st}$ element matrix and a $2^{nd}$ element matrix will be described in detail. The following description is also applicable to a case where the precoding matrix is generated based on three or more element matrices. A $1^{st}$ sub-matrix of the precoding matrix may be generated based on the $1^{st}$ element matrix, and a $2^{nd}$ sub-matrix of the precoding matrix may be generated based on the $2^{nd}$ element matrix. In the above equations, $Q_{1,Nt\times R}(k)$ denotes the $1^{st}$ element matrix, and $Q_{2,Nt\times R}(k)$ denotes the $2^{nd}$ element matrix.

(1) The $1^{st}$ element matrix and the $2^{nd}$ element matrix can be respectively selected from within different codebooks. Alternatively, these matrices can be selected from within one codebook for Nt Tx antennas.

(2) Each of the $1^{st}$ element matrix and the $2^{nd}$ element matrix may vary depending on an index k.

(3) The $1^{st}$ element matrix and the $2^{nd}$ element matrix may be selected based on one CSI. For example, the CSI may include a PMI and an RI. Otherwise, the $1^{st}$ element matrix and the $2^{nd}$ element matrix may be selected based on different CSIs. That is, each component matrix may be selected by using CSIs independently fed back.

Hereinafter, a CSI fed back for the $1^{st}$ element matrix is called a $1^{st}$ CSI, and a CSI feed back for the $2^{nd}$ element matrix is called a $2^{nd}$ CSI.

(1) Each of the $1^{st}$ CSI and the $2^{nd}$ CSI may be transmitted periodically or non-periodically. For example, the $1^{st}$ CSI may be transmitted periodically, and the $2^{nd}$ CSI may be transmitted non-periodically. In this case, the $1^{st}$ CSI may be transmitted periodically through a PUCCH, and the $2^{nd}$ CSI may be transmitted non-periodically through a PUSCH.

(2) Both of the $1^{st}$ CSI and the $2^{nd}$ CSI may be transmitted periodically. In this case, it is assumed that the $1^{st}$ CSI is fed back with a $1^{st}$ period, and the $2^{nd}$ CSI is fed back with a $2^{nd}$ period. For example, the $1^{st}$ period may be aTTI, and the $2^{nd}$ period may be bTTI (where 'a' and 'b' are natural numbers). The $1^{st}$ period and the $2^{nd}$ period may be equal to or different from each other. The $1^{st}$ period and the $2^{nd}$ period may have an integer multiple relation. The $1^{st}$ period may be an integer multiple of the $2^{nd}$ period, or the $2^{nd}$ period may be an integer multiple of the $1^{st}$ period.

(3) A transmission time point of the $1^{st}$ CSI and a transmission time point of the $2^{nd}$ CSI may overlap. In this case, a receiver may drop one of the $1^{st}$ CSI and the $2^{nd}$ CSI.

As such, a CSI only for a part of the precoding matrix may be fed back to a transmitter. Accordingly, feedback overhead can be reduced. In addition, a CSI only for a specific antenna may be updated. If channel estimation accuracy of the specific Tx antenna is excellent, the CSI for the specific Tx antenna may be more frequently updated, or an amount of the CSI fed back for the specific Tx antenna may be increased. Accordingly, overall system performance can be optimized.

Each of the $1^{st}$ element matrix and the $2^{nd}$ element matrix can be selected from within one codebook for Nt Tx antennas. In this case, the $1^{st}$ element matrix and the $2^{nd}$ element matrix can be respectively selected from within different codebook subsets in a restrictive manner. That is, multiple codebook subsets can be configured from one codebook.

In codebook-based precoding, a codebook is configured with a limited number of matrices. The number of matrices constituting the codebook may be different or equal for each rank. For example, it is assumed that a codebook for 4 Tx antennas and for a rank r (where r=1, 2, 3, and 4) is configured with 16 matrices for each rank. Therefore, the codebook for the 4 Tx antennas is configured with 64 matrices. To regulate an interference amount for a neighboring BS, a BS can set a limitation so that a particular matrix cannot be used among the 64 matrices. As such, a matrix can be selected from within a subset of the codebook by limiting the use of a particular precoding matrix within the codebook. In this case, a bitmap format may be used to indicate whether each matrix constituting the codebook can be used. For example, if the codebook is configured with 64 matrices, an indicator having a length of 64 bits can be used to indicate whether each matrix can be used. Alternatively, another format may be used to indicate whether a matrix can be used in a particular group unit. When a matrix can be selected from within the subset of the codebook, the amount of the CSI fed back from the receiver may be reduced. Alternatively, feedback overhead may be maintained without change.

As described above, the precoding matrix can be configured based on a plurality of element matrices selected from within the codebook. For example, it is assumed that the precoding matrix is generated based on a $1^{st}$ element matrix to an $N^{th}$ element matrix (where N is a natural number). The $1^{st}$ element matrix to the $N^{th}$ element matrix may be selected from within the same codebook. In this case, the $1^{st}$ matrix to the $N^{th}$ matrix may be respectively selected from independent codebook subsets.

As such, although the plurality of element matrices are selected from within the same codebook, the BS may configure such that each element matrix is selected from a different codebook subset. The codebook subset of each element matrix can be configured differently. Accordingly, each of the plurality of element matrices may be configured to have a different sized feedback overhead. Alternatively, each of the plurality of element matrices may have the same feedback overhead.

Figure 12:
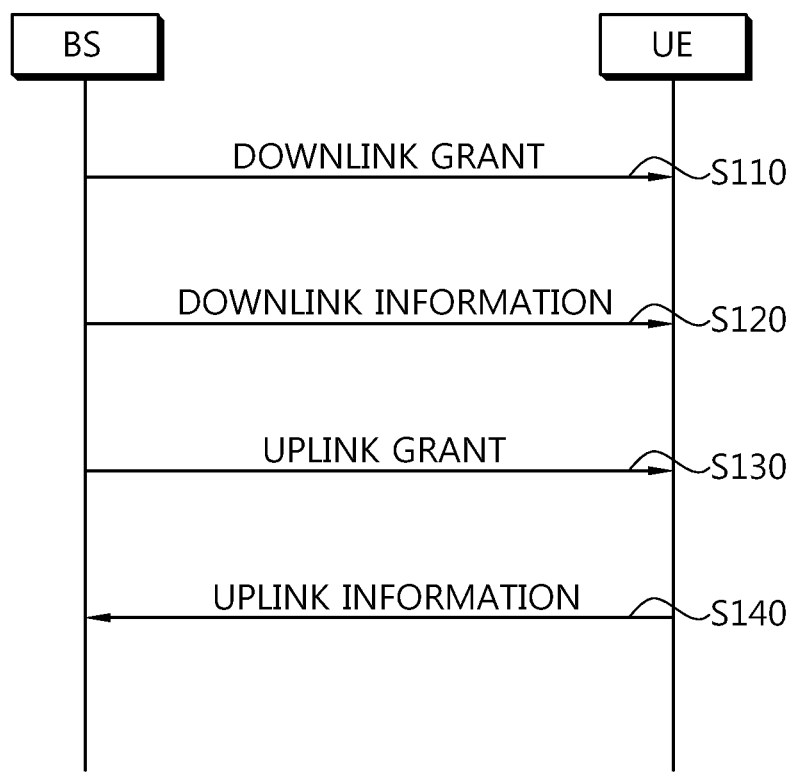
FIG. 12 is a flowchart showing an information transmission method according to an embodiment of the present invention.

FIG. 12 is a flowchart showing an information transmission method according to an embodiment of the present invention.

Referring to FIG. 12, a BS transmits a DL grant to a UE (step S110). The BS transmits DL information to the UE on the basis of the DL grant (step S120). The DL information is transmitted by using a precoding scheme according to the proposed method.

The DL grant may include a resource allocation field indicating a radio resource for transmitting the DL information, an MCS field indicating a modulation scheme and a channel coding scheme for the DL information, a MIMO information field, etc. The MIMO information field may include rank information, element matrix information, etc.

The BS transmits a UL grant to the UE (step S130). The UE transmits UL information to the BS on the basis of the UL grant (step S140). The UL information is transmitted by using the precoding scheme according to the proposed method.

The UL grant may include a resource allocation field indicating a radio resource for transmitting the UL information, an MCS field indicating a modulation scheme and a channel coding scheme for the UL information, a MIMO information field, etc. The MIMO information field may include rank information, element matrix information, etc.

Figure 13:
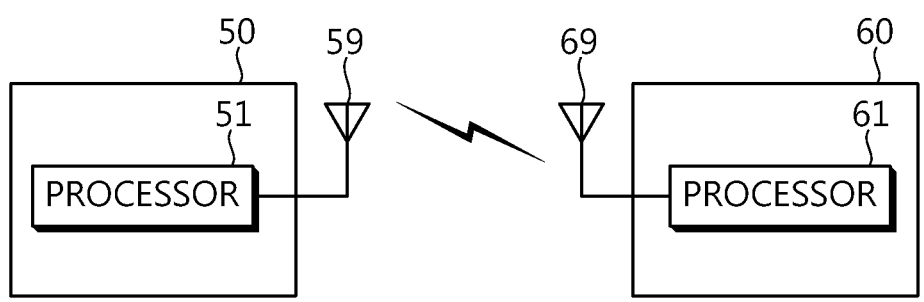
FIG. 13 is a block diagram showing an apparatus of wireless communication for implementing an embodiment of the present invention.

FIG. 13 is a block diagram showing an apparatus of wireless communication for implementing an embodiment of the present invention. A BS 50 includes a processor 51 and an antenna 59.

The processor 51 is coupled to the antenna 59, and implements the proposed functions, processes, and/or methods. Layers of a protocol stack may be implemented by the processor 51. The antenna 59 transmits or receives a signal. One or a plurality of antennas 59 may be provided. The BS 50 may further include a memory (not shown). The memory (not shown) is coupled to the processor 51, and stores a variety of information for driving the processor 51.

A UE 60 includes a processor 61 and an antenna 69. The processor 61 is coupled to the antenna 69, and implements the proposed functions, processes, and/or methods. Layers of a radio interface protocol may be implemented by the processor 61. The antenna 69 transmits a Tx signal or receives an Rx signal. One or a plurality of antennas 69 may be provided. The UE 60 may further include a memory (not shown). The memory (not shown) is coupled to the processor 61, and stores a variety of information for driving the processor 61.

The processors 51 and 61 may include an application-specific integrated circuit (ASIC), a separate chipset, a logic circuit, a data processing unit, and/or a radio frequency (RF) unit for mutually converting a baseband signal and a radio signal. The proposed transmitter may be implemented in the processors 51 and 61. The memory (not shown) may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory (not shown) and may be performed by the processors 51 and 61. The memory (not shown) may be located inside or outside the processors 51 and 61, and may be coupled to the processors 51 and 61 by using various well-known means.

Accordingly, an apparatus and method for effective information transmission in a wireless communication system are provided. Without having to newly prepare a codebook for extended Tx antennas, a previously prepared codebook of the legacy system can be directly used. Therefore, backward compatibility with the legacy system can be maintained. The support of compatibility between the two systems facilitates user convenience. In addition, the compatibility between the two systems is also advantageous from the perspective of service providers since the existing equipment can be reused. A case where the number of Tx antennas is increased can be handled flexibly. When the number of Tx antennas is increased, a CSI to be fed back may be excessively increased. When the precoding matrix is generated based on the conventional codebook, feedback overhead may be regulated. Therefore, reliability of wireless communication can be increased, and overall system performance can be improved.

Additional advantages, objectives, and features of the present invention will become more apparent to those of ordinary skill in the art upon implementation of the present invention based on the aforementioned descriptions or explanation. Moreover, other unexpected advantages may be found as those ordinary skilled in the art implement the present invention based on the aforementioned explanations.

In view of the exemplary systems described herein, methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of transmitting a control signal related to a precoding scheme in a wireless communication system, the method comprising:
    receiving, by a wireless device from a network device, codebook subset information restricting a possible precoding matrix to be selected by the wireless device from a plurality of possible precoding matrices to a precoding matrix suitable for a channel;
    selecting, by the wireless device, an MtxR precoding matrix based on the codebook subset information,
    wherein the selected MtxR precoding matrix is to be used for a plurality of antenna ports of the network device; and
    transmitting, by the wireless device to the network device, information on the selected MtxR precoding matrix,
    wherein Mt denotes a number of the plurality of antenna ports and R denotes a number of layers for the restricted precoding matrix,
    wherein the MtxR precoding matrix is the restricted precoding matrix and is configured in a form of $$\begin{pmatrix} w1 \cdot Q1 & w1 \cdot Q2 \\ w2 \cdot Q3 & -w2 \cdot Q4 \end{pmatrix},$$

wherein Q1 denotes a first element matrix for the MtxR precoding matrix, Q2 denotes a second element matrix for the MtxR precoding matrix, Q3 denotes a third element matrix for the MtxR precoding matrix, and Q4 denotes a fourth element matrix for the MtxR precoding matrix,
    wherein w1 denotes a weight for the first and second element matrices, and w2 denotes a weight for the third and fourth element matrices, and
    wherein each of the first, second, third and fourth element matrices has Nt rows, wherein Nt is defined by Nt=Mt/2.

2. The method of claim 1, wherein the Mt is set to 8 and R is set to 2.

3. A wireless device for transmitting a control signal related to a precoding scheme in a wireless communication system, the apparatus comprising:
    a radio frequency unit configured to transmit and receive a signal; and
    a processor coupled to the radio frequency unit and configured to:
        receive, from a network device, codebook subset information restricting a possible precoding matrix to be selected by the processor from a plurality of possible precoding matrices to a precoding matrix suitable for a channel;
        select an MtxR precoding matrix based on the codebook subset information,
        wherein the selected MtxR precoding matrix is to be used for a plurality of antenna ports of the network device;
        control the radio frequency unit to transmit information on the selected MtxR precoding matrix to the network device,
    wherein Mt denotes a number of the plurality of antenna ports and R denotes a number of layers for the restricted precoding matrix,
    wherein the MtxR precoding matrix is the restricted precoding matrix and is configured in a form of $$\begin{pmatrix} w1 \cdot Q1 & w1 \cdot Q2 \\ w2 \cdot Q3 & -w2 \cdot Q4 \end{pmatrix},$$

wherein Q1 denotes a first element matrix for the MtxR precoding matrix, Q2 denotes a second element matrix for the MtxR precoding matrix, Q3 denotes a third element matrix for the MtxR precoding matrix, and Q4 denotes a fourth element matrix for the MtxR precoding matrix,
    wherein w1 denotes a weight for the first and second element matrices, and w2 denotes a weight for the third and fourth element matrices, and
    wherein each of the first, second, third and fourth element matrices has Nt rows, wherein Nt is defined by Nt=Mt/2.

4. The apparatus of claim 3, wherein the Mt is set to 8 and R is set to 2.

* * * * *